(12) United States Patent
Torgerson

(10) Patent No.: US 12,527,964 B2
(45) Date of Patent: Jan. 20, 2026

(54) MEDICAL DEVICE PROGRAMMING

(71) Applicant: Medtronic, Inc., Minneapolis, MN (US)

(72) Inventor: Nathan A. Torgerson, Andover, MN (US)

(73) Assignee: Medtronic, Inc., Minneapolis, MN (US)

( * ) Notice: Subject to any disclaimer, the term of this patent is extended or adjusted under 35 U.S.C. 154(b) by 310 days.

(21) Appl. No.: 18/251,873

(22) PCT Filed: Nov. 10, 2021

(86) PCT No.: PCT/US2021/072336
§ 371 (c)(1),
(2) Date: May 26, 2023

(87) PCT Pub. No.: WO2022/126057
PCT Pub. Date: Jun. 16, 2022

(65) Prior Publication Data
US 2024/0261577 A1 Aug. 8, 2024

Related U.S. Application Data

(60) Provisional application No. 63/122,176, filed on Dec. 7, 2020.

(51) Int. Cl.
*A61N 1/372* (2006.01)
*A61N 1/05* (2006.01)
*A61N 1/36* (2006.01)

(52) U.S. Cl.
CPC ....... *A61N 1/37264* (2013.01); *A61N 1/0551* (2013.01); *A61N 1/36062* (2017.08); *A61N 1/36153* (2013.01); *A61N 1/36157* (2013.01); *A61N 1/36171* (2013.01); *A61N 1/36175* (2013.01); *A61N 1/37247* (2013.01)

(58) Field of Classification Search
None
See application file for complete search history.

(56) References Cited

U.S. PATENT DOCUMENTS

| 6,842,643 B1 * | 1/2005 | Schwartz ........... A61N 1/37264 |
| | | 607/30 |
| 9,867,992 B2 | 1/2018 | Sieracki et al. |
| 2014/0107567 A1 | 4/2014 | Goetz |

OTHER PUBLICATIONS

International Preliminary Report on Patentability from International Application No. PCT/US2021/072336 dated Jun. 22, 2023, 8 pp.
(Continued)

*Primary Examiner* — Carl H Layno
*Assistant Examiner* — Bryan Mcallister Lee
(74) *Attorney, Agent, or Firm* — Shumaker & Sieffert, P.A.

(57) ABSTRACT

A system for providing stimulation to a patient, the system comprising one or more processors. The one or more processors are configured to receive an updated program indicating a plurality of stimulation parameters to configure a medical device to apply the stimulation to the patient and generate difference information based on one or more differences between an existing program and the updated program. The one or more processors are further configured to output the difference information to configure the medical device to apply stimulation to the patient with the plurality of stimulation parameters.

20 Claims, 9 Drawing Sheets

(56) References Cited

OTHER PUBLICATIONS

International Search Report and Written Opinion of International Application No. PCT/US2021/072336 dated Mar. 2, 2022, 12 pp.

* cited by examiner

MEDICAL DEVICE PROGRAMMING

This application is a U.S. National Stage entry under 35 U.S.C. § 371 of International Application No. PCT/US2021/072336, filed Nov. 10, 2021, which claims priority to and the benefit of U.S. Provisional Patent Application No. 63/122,176, filed on Dec. 7, 2020, the entire content of each of which is incorporated herein by reference.

TECHNICAL FIELD

This disclosure generally relates to medical devices, and more specifically, electrical stimulation.

BACKGROUND

Medical devices (e.g., an implantable medical device or an external medical device) may include electrical stimulation devices, drug pumps, insulin pumps, or cardiac stimulation devices. Electrical stimulation devices, for example, neurostimulators or neurostimulation devices, may be external to or implanted within a patient, and configured to deliver electrical stimulation therapy to various tissue sites to treat a variety of symptoms or conditions such as chronic pain, tremor, Parkinson's disease, epilepsy, or other neurological disorders, urinary or fecal incontinence, sexual dysfunction, obesity, or gastroparesis. An electrical stimulation device may deliver electrical stimulation therapy via electrodes, e.g., carried by one or more leads, positioned proximate to target locations associated with the brain, the spinal cord, pelvic nerves, tibial nerves, peripheral nerves, the gastrointestinal tract, or elsewhere within a patient. Stimulation proximate the spinal cord, proximate the sacral nerve, within the brain, and proximate peripheral nerves is often referred to as spinal cord stimulation (SCS), sacral neuromodulation (SNM), deep brain stimulation (DBS), and peripheral nerve stimulation (PNS), respectively.

SUMMARY

In general, the disclosure describes techniques for programming medical devices, such as implantable medical devices, to apply selected program stimulation parameters (e.g., neurostimulation parameters). For example, the techniques may include techniques for programming medical devices to apply selected stimulation parameters or stimulation parameter adjustments. In some examples, the techniques may be used to manually, automatically or semi-automatically select one or more stimulation parameters such as, for example, electrode selections, combinations and polarities, stimulation amplitude, pulse width, pulse rate, or cycling, adjustments to such parameters, and/or programs specifying such parameters, for delivery of stimulation by a medical device, such as, for example, an implantable medical device (IMD).

The techniques of this disclosure, in some examples, include a system configured to receive an updated program or group of programs indicating selections of a plurality of stimulation parameters. For example, the system may generate difference information based on a comparison of the updated program and an existing program configured at a medical device. For example, if the updated program only changes a polarity for a set of electrodes, the system may generate the difference information to indicate the polarity for the set of electrodes and omit other stimulation parameters. The system configures the medical device with the updated program using the difference information, which may configure the medical device with the updated program in less time than systems that configure the medical device with the entire updated program.

In this way, system may respond to a change in patient activity (e.g., sitting down, standing up, or initiating a bodily function) faster than systems that rely on sending a complete group or program (e.g., a complete set of stimulation parameters), which may improve a therapy provided to the patient. Moreover, transmitting the difference information instead of the updated program may reduce an amount of data transmitted to the medical device, which may reduce power consumption of the medical device. Reducing the power consumption of the medical device may increase the longevity of a primary battery of the medical device, or reduce a number of times a rechargeable battery of the medical device is discharged and charged in a period of time, which may increase an amount of time that the medical device may be used for a patient. Increasing an amount of time that the medical device may be used may improve a therapy for a patient, particularly when the medical device is an implanted device. Further, reducing the power consumption of the medical device may reduce an amount of time that a patient may spend charging the medical device, which may improve patient satisfaction. Moreover, reducing the amount of data transmitted to the medical device may help to provide a failsafe operation that is more reliable and less likely to be impacted by packet drops, data corruption, and a reduction or loss of connectivity compared to systems that rely on sending a complete group or program (e.g., a complete set of neurostimulation parameters).

The techniques of this disclosure, in some examples, include a system configured to store a data structure (e.g., a table) group of programs in an external programmer to allow a selection of a group or program from one or more pre-stored groups of programs for programming of a medical device (e.g., an implantable neurostimulation device). For example, a remote server or remote client may "pre-prepare" an external programmer with a data structure of groups of programs (e.g., tens, hundreds, or thousands of groups of programs). For instance, the pre-stored groups of programs may be configured to provide broad therapy for one or more diseases, disorders or injuries. After pre-preparing the external programmer with the pre-stored groups of programs, the remote server or remote client (e.g., with an algorithm, responsive to input form a health provider, etc.) may select a group from the stored group stored at an external programmer.

In this example, rather than transmitting the entire set of stimulation parameters for one or more programs in the selected group, the remote server or remote client may transmit an indication of a selected group of programs (e.g., an identifier for the selected group) that is present among the pre-stored groups in a local, external programmer. In this example, the external programmer may configure the medical device using the indication of the selected group of programs of the pre-stored groups. In this way, system may respond to a change in a patient activity (e.g., sitting down, standing up, or initiating a bodily function) faster than systems that rely on sending a complete group or program (e.g., a complete set of neurostimulation parameters), which may improve a therapy provided to the patient. Moreover, transmitting the indication of the selected group of programs may reduce an amount of data transmitted to the medical device, which may reduce power consumption of the medical device. Reducing the power consumption of the medical device may reduce a number of times a battery of the medical device is discharged and charged in a period of time, which may increase an amount of time that the medical device may be used for a patient. Increasing an amount of time that the medical device may be used, may improve a therapy for a patient, particularly when the medical device is an implanted device. Further, reducing the power consumption of the medical device may reduce an amount of time that a patient may spend charging the medical device, which may improve patient satisfaction. Moreover, reducing the amount of data transmitted to the medical device may help to provide a failsafe operation that is more reliable and less likely to be impacted by packet drops, data corruption, and a reduction or loss of connectivity compared to systems that rely on sending a complete group or program (e.g., a complete set of neurostimulation parameters).

In one example a method for providing stimulation to a patient includes receiving, by processing circuitry, an updated program indicating a plurality of stimulation parameters to configure a medical device to apply the stimulation to the patient and generating, by the processing circuitry, difference information based on one or more differences between an existing program and the updated program. The method further comprises outputting, by the processing circuitry, the difference information to configure the medical device to apply stimulation to the patient with the plurality of stimulation parameters.

In another example, a method for providing stimulation to a patient includes receiving, by processing circuitry of an external programmer, difference information indicating a subset of a plurality of stimulation parameters to apply the stimulation to the patient and determining, by the processing circuitry, an updated program indicating the plurality of stimulation parameters based on an existing program and the difference information. The method further includes causing, by the processing circuitry, the medical device to apply the updated program to configure the medical device to apply stimulation to the patient with the plurality of stimulation parameters.

In one example, a method for providing stimulation to a patient includes receiving, by processing circuitry, a selected group of programs, each program of the selected group of programs indicating a plurality of stimulation parameters for configuring a medical device to apply the stimulation to the patient and generating, by the processing circuitry, a group identifier identifying the selected group of programs in pre-stored groups of programs. The method further includes outputting, by the processing circuitry, the group identifier to configure the medical device to apply the stimulation to the patient with the selected group of programs.

In another example, a method for providing stimulation to a patient includes receiving, by processing circuitry, a group identifier identifying an selected group of programs in pre-stored groups of programs, each program of the selected group of programs indicating a plurality of stimulation parameters for configuring a medical device to apply the stimulation to the patient and determining, by the processing circuitry, the selected group of programs based on the pre-stored groups of programs and the group identifier. The method further includes outputting, by the processing circuitry, an indication of the selected group of programs to the medical device to configure the medical device to apply the stimulation to the patient with the selected group of programs.

In one example, a computer-readable storage medium includes instructions that when executed cause one or more processors to receive an updated program indicating a plurality of stimulation parameters to configure a medical device to apply the stimulation to the patient and generate difference information based on one or more differences between an existing program and the updated program. The instructions further cause the one or more processors to output the difference information to configure the medical device to apply stimulation to the patient with the plurality of stimulation parameters.

In another example, a method for providing stimulation to a patient includes receiving, by processing circuitry, an updated program indicating a plurality of stimulation parameters to configure a medical device to apply the stimulation to the patient and generating, by the processing circuitry, difference information based on one or more differences between an existing program and the updated program. The method further comprises outputting, by the processing circuitry, the difference information to configure the medical device to apply stimulation to the patient with the plurality of stimulation parameters.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
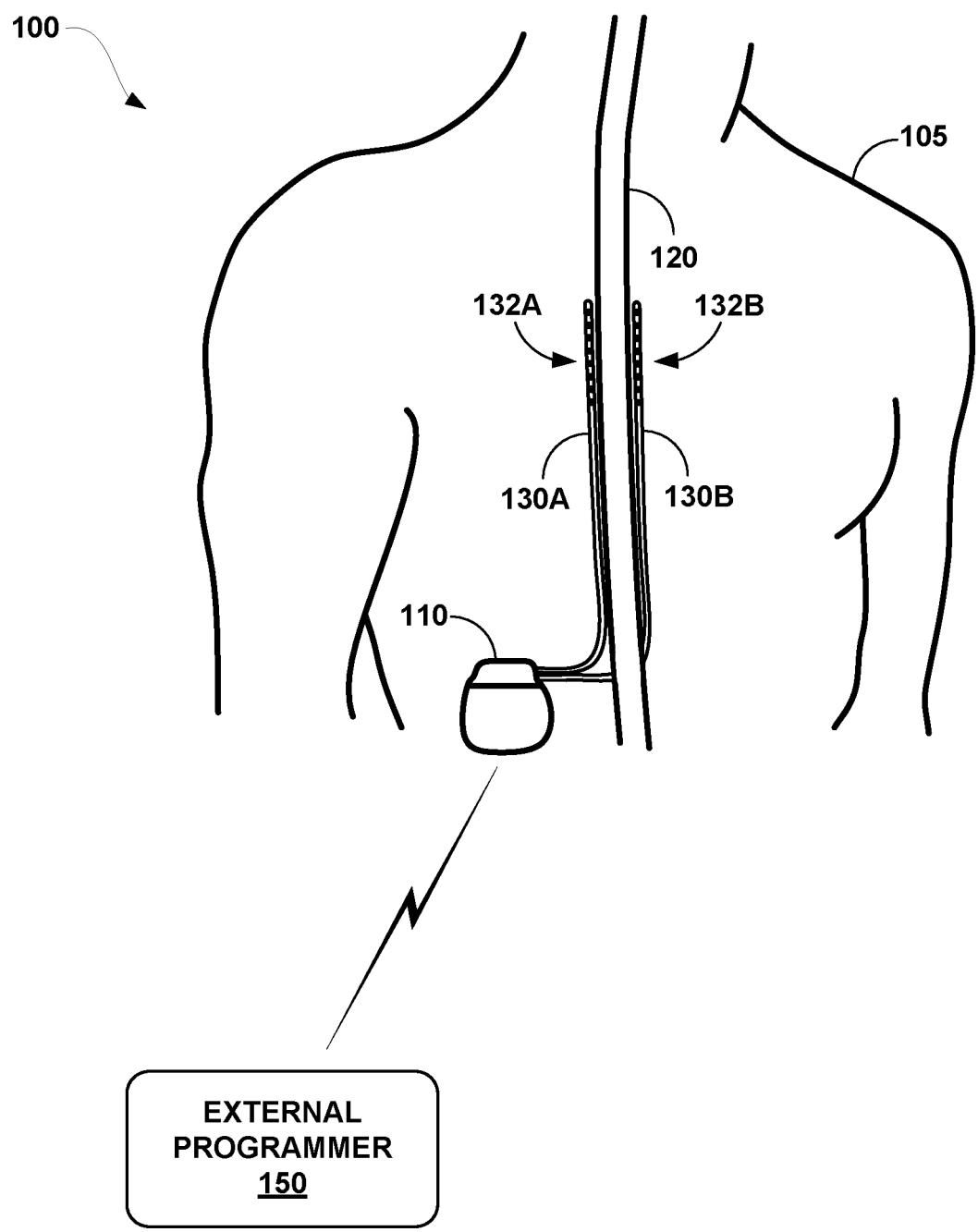
FIG. 1 is a conceptual diagram illustrating an example system that includes an implantable medical device (IMD) in the form of a neurostimulation device configured to deliver spinal cord stimulation (SCS) and an external programmer, in accordance with one or more techniques of this disclosure.

Efficacy of stimulation (e.g., neurostimulation) in eliminating or alleviating symptoms, preventing or delaying onset or progression of aspects of, or restoring functions impaired or diminished by a disease, disorder, syndrome or injury, may vary according to the parameters used to deliver the stimulation to a patient. Selection of electrode positions relative to a neural target, as one example, can elicit a desired response to the stimulation. Delivering stimulation with different stimulation parameters, such as different electrodes, electrode combinations and/or polarities, or different stimulation amplitudes, pulse widths, pulse rates, or cycling can result in differences in efficacy for a variety of therapies such as, for example, spinal cord stimulation (SCS) to relieve pain or restore physical function or control in the case of spinal cord injury or degeneration.

A medical device may deliver stimulation to a patient using one or more "programs," where each program may indicate one or more stimulation parameters such as, for example, electrode selections, combinations and polarities, stimulation amplitude, pulse width, pulse rate, or cycling, adjustments to such parameters, and/or programs specifying such parameters, for delivery of stimulation by a medical device, such as, for example, an implantable medical device (IMD). For example, the medical device may store N groups of programs, each providing M programs defining different sets of stimulation parameters, wherein N and M may be the same or different. In one example, the medical device may have N=3 groups and each group may include up to M=4 programs. For example, within a group of programs, a first program may provide a therapy for leg pain, a second program may provide a first therapy for back pain, and a third program may provide a second therapy for the back pain. In this example, the medical device may provide stimulation using both the first program and one of the second program or the third program. In this way, a single medical device may provide therapy for multiple symptoms (e.g., leg pain and back pain). In some examples, a medical device may deliver therapy according to a plurality of programs in a group of programs, e.g., on a time-interleaved basis with one another.

An external programmer may configure a medical device with different groups of programs, and different programs within a group of programs. For example, a patient, caretake, or health professional may generate, with the external programmer, a new program or program group to improve a therapy. In this example, the external programmer may configure the medical device with new program(s) and set the stimulation to apply the new program(s) to provide stimulation to provide the improved therapy to the patient. In some examples, the external programmer may be configured to automatically or semi-automatically generate the new program to improve therapy, e.g., in response to an event, such as a sensed condition. For example, in response to a change from a first activity (e.g., a patient sitting) to a second activity (e.g., walking), the external programmer may generate a new program that may provide more effective therapy (e.g., pain management) for the second activity than the existing program. In this way, the medical device may be modified or customized, for example, after being implanted into the patient.

A remote device (e.g., a remote server and/or a remote client) may configure the programming of the medical device. For example, a health professional may remotely or locally generate a new program or programs to improve therapy and transmit (e.g., using the Internet and/or a wireless connection) the new program(s) to the external programmer, e.g., individually or part of a group of programs. In some examples, the remote device may be configured to automatically or semi-automatically generate the new program to improve therapy, e.g., in response to an event, such as a sensed condition. For example, in response to a change from a first activity (e.g., a patient sitting) to a second activity (e.g., walking), the remote device may generate a new program that may provide more effective therapy (e.g., pain management) for the second activity than the existing program. In this example, the external programmer may configure the medical device with the new program(s) and set the medical device to apply the new program(s) to provide stimulation to provide the improved therapy to the patient. In this way, the medical device may be configured to automatically or semi-automatically (e.g., with a user input) program the medical device, which may reduce a delay in providing an updated or improved therapy compared to systems that may rely only changes provided by a health professional.

To allow communication for a remote device (e.g., a remote server and/or a remote client), some systems may output the updated program to an external programmer. For example, the remote device may output a value for each one of the stimulation parameters of the updated program. Once all of the values for the stimulation parameters are received, the external programmer may configure the medical device with the new program and set the stimulation to apply the new program to provide stimulation to provide the improved therapy to the patient. For example, in response for a change from a first activity (e.g., a patient sitting) to a second activity (e.g., walking), the remote device may generate a new program that may provide more effective therapy (e.g., pain management). In this example, transmitting all of the stimulation parameters may occur significantly after the patient has performed the second activity, which may result in ineffective treatment (e.g., pain).

The techniques of this disclosure include a system configured to receive an updated program indicating selections of a plurality of stimulation parameters or an updated group of programs. For example, the system (e.g., using an application programming interface (API)) may generate difference information based on a comparison of the updated program and an existing program configured at a medical device or the update group of programs and an existing group of programs configured at the medical device. For example, if the updated program or updated group of programs changes only a polarity for a set of electrodes for the existing program or one program in a group of programs, the system may generate the difference information to indicate the polarity for the set of electrodes and omit other stimulation parameters of the existing program and/or of other programs of the group of programs. The system may configure the medical device with the updated program using the difference information. Configuring the medical device with the updated program using the difference information may configure the medical device with the updated program or an updated group of programs in less time than systems that configure the medical device with the entire updated program or entire updated group of programs because the medical device may partially overwrite a portion of the program or group of programs based on the difference information identified by the comparison rather than overwriting the entire program or group of programs. In this way, system may respond to a patient activity (e.g., sitting down, standing up, or initiating a bodily function) faster than systems that rely on sending a complete set of stimulation parameters, which may improve a therapy provided to the patient. For instance, rather than a system to take a relatively long time (e.g., 30 seconds) to accommodate a change in patient activity (e.g., sitting to walking), techniques described herein for using difference information may permit the system to accommodate the change in patient activity in a relatively short amount of time (e.g., sub-second).

Moreover, transmitting the difference information instead of the updated program may reduce an amount of data transmitted to the medical device, which may reduce a power consumption of the medical device. Reducing the power consumption of the medical device may increase the longevity of a primary battery of the medical device, or reduce a number of times a rechargeable battery of the medical device is discharged and charged in a period of time, which may increase an amount of time that the medical device may be used for a patient. Increasing an amount of time that the medical device may be used may improve a therapy for a patient, particularly when the medical device is an implanted device. Further, reducing the power consumption of the medical device may reduce an amount of time that a patient may spend charging the medical device, which may improve patient satisfaction. Moreover, reducing the amount of data transmitted to the medical device may help to provide a failsafe operation that is more reliable and less likely to be impacted by packet drops, data corruption, and a reduction or loss of connectivity compared to systems that rely on sending a complete group or program (e.g., a complete set of neurostimulation parameters).

Additionally, or alternatively, the techniques of this disclosure include a system configured to use a pre-stored groups of programs stored by an external programmer to allow a selection of a program. As used herein a program may refer to a set of stimulation parameters for treatment. For example, a first program may include a first set of stimulation parameters for treatment of back pain while a patient is standing and a second program may include a second set of stimulation parameters for back pain while the patient is lying down. A program may include a set of stimulation parameters that includes, for example, one or more electrode selections, one or more selections of one or more electrode polarities, one or more stimulation amplitude values, one or more pulse width value, one or more pulse rate values, one or more cycling values, or another stimulation parameter. In contrast, a group of programs may include a plurality of programs configured to be used together (e.g., used one at a time on an interleaved basis and/or used simultaneously). For example, a first group of programs may include a first program for treatment of back pain when a patient is standing and a second program for neck pain when the patient is standing. In this example, a second group may include a third program for treatment of back pain when the patient is standing and a fourth program for neck pain when the patient is standing. In some examples described herein, each group may include two, three, or four programs. However, in some examples a group may include two, three, four, five, or more than five programs.

For example, a remote device (e.g., a remote server or remote client) may "pre-prepare" an external programmer with a data structure (e.g., a table) of pre-stored groups of programs (e.g., tens, hundreds, or thousands of groups of programs). For instance, the pre-stored groups of programs may be configured to provide broad therapy for one or more diseases. After pre-preparing the external programmer with the pre-stored groups of programs, the remote device (e.g., with an algorithm, responsive to input form a health provider, etc.) may select a group from the pre-stored groups of programs stored at an external programmer. In this example, rather than transmitting the entire set of stimulation parameters for the selected group, the remote server or remote client may transmit an indication of the selected group (e.g., an identifier for the selected group). In this example, the external programmer may then configure the medical device using the indication of the selected group and the pre-stored groups of programs. For example, the external programmer may determine, with an API, stimulation parameters for the selected group, and transmit an indication of the stimulation parameters for the selected group to the medical device. For instance, the external programmer may transmit the entire set of stimulation parameters for each program of the selected group of programs, the entire set of stimulation parameters for each program of the selected group that is changed from an existing group configured at the medical device, one or more stimulation parameters that are changed from the existing group configured at the medical device. In this way, system may respond to a patient activity (e.g., standing up) faster than systems that rely on sending a complete set of stimulation parameters, e.g., across a network, which may improve a therapy provided to the patient.

Moreover, transmitting the indication of the selected group of programs instead of the complete set of stimulation parameters for the selected group of programs may reduce an amount of data transmitted to the medical device, which may reduce a power consumption of the medical device. Reducing the power consumption of the medical device may increase the longevity of a primary battery of the medical device, or reduce a number of times a rechargeable battery of the medical device is discharged and charged in a period of time, which may increase an amount of time that the medical device may be used for a patient. Increasing an amount of time that the medical device may be used may improve a therapy for a patient, particularly when the medical device is an implanted device. Further, reducing the power consumption of the medical device may reduce an amount of time that a patient may spend charging the medical device, which may improve patient satisfaction. Moreover, reducing the amount of data transmitted to the medical device may help to provide a failsafe operation that is more reliable and less likely to be impacted by packet drops, data corruption, and a reduction or loss of connectivity compared to systems that rely on sending a complete group or program (e.g., a complete set of neurostimulation parameters).

Techniques described herein may be directed to implantable medical devices and external medical devices. Examples described herein may describe techniques with reference to medical devices, however, aspects of such techniques may apply to any medical device. Again, examples of medical devices, which may be external or implantable), may include drug pumps, insulin pumps, or cardiac stimulation devices, to the extent such medical devices benefit from receiving: (a) a delta write rather than an entire group overwrite; or (b) a group or delta write based on remote selection of one of a plurality of groups stored locally on an external programmer.

FIG. 1 is a conceptual diagram illustrating an example system 100 that includes an implantable medical device (IMD) 110 configured to deliver spinal cord stimulation (SCS) therapy, processing circuitry 140, and an external programmer 150, in accordance with one or more examples of this disclosure. Although the examples described in this disclosure are generally applicable to a variety of medical devices including external devices and IMDs, application of such techniques to IMDs and, more particularly, implantable electrical stimulators (e.g., neurostimulators) will be described for purposes of illustration. More particularly, the disclosure will refer to an implantable SCS system for purposes of illustration, but without limitation as to other types of medical devices or other therapeutic applications of stimulation.

IMD 110 may be configured to provide therapy (e.g., neurostimulation) using a group of programs. As used herein, a group of programs may refer to one or more programs. In some examples, a plurality of programs of a group may be applied simultaneously. In other examples, programs of the group may be applied at different times (e.g., on a time-interleaved basis). As described further herein, external programmer 150 may program IMD 110 using difference information. Additionally, or alternatively, external programmer 150 may store a pre-stored group of a groups of programs to allow a selection of a program.

As shown in FIG. 1, system 100 includes an IMD 110, leads 130A and 130B, and external programmer 150 shown in conjunction with a patient 105, who is ordinarily a human patient. In the example of FIG. 1, IMD 110 is an implantable electrical stimulator that is configured to generate and deliver electrical stimulation therapy to patient 105, e.g., for relief of chronic pain or other symptoms, or restoration or support of physical function or control in the case of spinal cord injury or degeneration, via one or more electrodes 132A, 132B of leads 130A and/or 130B, respectively. In the example of FIG. 1, each lead 130A, 130B includes eight electrodes 132A, 132B respectively, although the leads may each have a different number of electrodes. Leads 130A, 130B may be referred to collectively as "leads 130" and electrodes 132A, 132B may be referred to collectively as electrodes 132. In other examples, IMD 110 may be coupled to a single lead carrying multiple electrodes or more than two leads each carrying multiple electrodes.

IMD 110 may be a chronic electrical stimulator that remains implanted within patient 105 for weeks, months, or years. In other examples, IMD 110 may be a temporary, or trial, stimulator used to screen or evaluate the efficacy of electrical stimulation for chronic therapy. In one example, IMD 110 is implanted within patient 105, while in another example, IMD 110 is an external device coupled to one or more leads percutaneously implanted within the patient. In some examples, IMD 110 uses electrodes on one or more leads, while in other examples, IMD 110 use one or more electrodes on a lead or leads and one of more electrodes on a housing of the IMD. In further examples, IMD 110 may be leadless and instead use only electrodes carried on a housing of IMD.

IMD 110 may be constructed of any polymer, metal, or composite material sufficient to house the components of IMD 110 (e.g., components illustrated in FIG. 2) within patient 105. In this example, IMD 110 may be constructed with a biocompatible housing, such as titanium or stainless steel, or a polymeric material such as silicone, polyurethane, or a liquid crystal polymer, and surgically implanted at a site in patient 105 near the pelvis, abdomen, or buttocks. In other examples, IMD 110 may be implanted at other suitable sites within patient 105, which may depend, for example, on the target site within patient 105 for the delivery of electrical stimulation therapy. The outer housing of IMD 110 may be configured to provide a hermetic seal for components, such as a rechargeable or non-rechargeable power source. In addition, in some examples, the outer housing of IMD 110 is selected from a material that facilitates receiving energy to charge the rechargeable power source.

In the example of FIG. 1, electrical stimulation energy, which may be delivered as regulated current or regulated voltage-based pulses, is delivered from IMD 110 to one or more target tissue sites of patient 105 via leads 130 and electrodes 132. Leads 130 position electrodes 132 adjacent to target tissue of spinal cord 120. One or more of the electrodes 32 may be disposed at a distal tip of a lead 130 and/or at other positions at intermediate points along the lead. Leads 130 may be implanted and coupled to IMD 110. The electrodes 132 may transfer electrical stimulation generated by an electrical stimulation generator in IMD 110 to tissue of patient 105. Although leads 130 may each be a single lead, a lead 130 may include a lead extension or other segments that may aid in implantation or positioning of lead 130.

The electrodes of leads 130 may be electrode pads on a paddle lead, circular (e.g., ring) electrodes surrounding the body of the lead, conformable electrodes, cuff electrodes, segmented electrodes (e.g., electrodes disposed at different circumferential positions around the lead instead of a continuous ring electrode), any combination thereof (e.g., ring electrodes and segmented electrodes) or any other type of electrodes capable of forming unipolar, bipolar or multipolar electrode combinations for therapy. Ring electrodes arranged at different axial positions at the distal ends of lead 130 will be described for purposes of illustration. Deployment of electrodes via leads 130 is described for purposes of illustration, but electrodes may be arranged on a housing of IMD 110, e.g., in rows and/or columns (or other arrays or patterns), as surface electrodes, ring electrodes, or protrusions.

Stimulation parameters defining the electrical stimulation pulses delivered by IMD 110 through electrodes 132 of leads 130 may include information identifying which electrodes have been selected for delivery of the stimulation pulses according to a stimulation program and the polarities of the selected electrodes (the electrode combination), and voltage or current amplitude, pulse rate (e.g., frequency), and pulse width of the stimulation pulses. The stimulation parameters may further include a cycle parameter that specifies when, or how long, stimulation is turned on and off. Stimulation parameters may be programmed prior to delivery of the stimulation pulses, manually adjusted based on user input, or automatically controlled during delivery of the stimulation pulses, e.g., based on sensed conditions.

Although the example of FIG. 1 is directed to SCS therapy, e.g., to treat pain or restore or support physical function or control in the case of spinal cord injury or degeneration, in other examples, system 100 may be configured to treat other conditions that may benefit from stimulation therapy. For example, system 100 may be used to treat tremor, Parkinson's disease, epilepsy, or other neurological disorders, urinary or fecal incontinence, sexual dysfunction, obesity, or gastroparesis, or psychiatric disorders such as depression, mania, obsessive compulsive disorder, or anxiety disorders. Hence, in some examples, system 100 may be configured to deliver sacral neuromodulation (SNM), deep brain stimulation (DBS), peripheral nerve stimulation (PNS), or other stimulation, such as peripheral nerve field stimulation (PNFS), cortical stimulation (CS), gastrointestinal stimulation, or any other stimulation therapy capable of treating a condition of patient 105.

Leads 130 may include, in some examples, one or more sensors configured to sense one or more physiological parameters of patient 105, such as patient activity, pressure, temperature, or other characteristics. At least some of electrodes 132 may be used to sense electrical signals within patient 105, additionally or alternatively to delivering stimulation. IMD 110 is configured to deliver electrical stimulation therapy to patient 105 via selected combinations of electrodes carried by one or both of leads 130, alone or in combination with an electrode carried by or defined by an outer housing of IMD 110. The target tissue for the electrical stimulation therapy may be any tissue affected by electrical stimulation. In some examples, the target tissue includes nerves, smooth muscle or skeletal muscle. In the example illustrated by FIG. 1, the target tissue is tissue proximate spinal cord 120, such as within an intrathecal space or epidural space of spinal cord 120, or, in some examples, adjacent nerves that branch off spinal cord 120. Leads 130 may be introduced into spinal cord 120 in via any suitable region, such as the thoracic, cervical or lumbar regions.

Stimulation of spinal cord 120 may, for example, prevent pain signals from traveling through spinal cord 120 and to the brain of patient 105. Patient 105 may perceive the interruption of pain signals as a reduction in pain and, therefore, efficacious therapy results. In other examples, stimulation of spinal cord 120 may produce paresthesia which may reduce the perception of pain by patient 105, and thus, provide efficacious therapy results. In some examples, some electrical stimulation pulses may be directed to glial cells while other electrical stimulation (e.g., delivered by a different electrode combination) is directed to neurons. In other examples, electrical stimulation pulses may be directed to restore a function lost due to a spinal cord injury.

IMD 110 may generate and may deliver electrical stimulation therapy to a target stimulation site within patient 105 via the electrodes of leads 130 to patient 105 according to one or more therapy stimulation programs. A therapy stimulation program specifies values for one or more parameters that define an aspect of the therapy delivered by IMD 110 according to that program. For example, a therapy stimulation program that controls delivery of stimulation by IMD 110 in the form of stimulation pulses may define values for voltage or current pulse amplitude, pulse width, and pulse rate (e.g., pulse frequency) for stimulation pulses delivered by IMD 110 according to that program, as well as the particular electrodes and polarities forming an electrode combination used to deliver the stimulation pulses.

A user, such as a clinician, caretaker, or patient 105, may interact with a user interface of an external programmer 150 to program IMD 110. External programmer 150 may represent a physician programmer or patient programmer. In some examples, techniques described herein for using difference information and/or using a selection of a group of programs from pre-stored groups of programs may include communication between one or more physician programmers (or remote programming interfaces) and one or more patient programmers. Programming of IMD 110 may refer generally to the generation and transfer of commands, programs, or other information to control the operation of IMD 110. In this manner, IMD 110 may receive the transferred commands and programs from external programmer 150 to control electrical stimulation therapy.

External programmer 150 may transmit therapy stimulation programs, program groups, stimulation parameter adjustments, therapy stimulation program selections, user input, or other information to control the operation of IMD 110, e.g., by wireless telemetry or wired connection. For example, external programmer 150 may configure a complete group or program overwrite. For instance, external programmer 150 may configure IMD 110 with a group of programs (e.g., Group A') that is completely different from a set of programs configured at IMD 110 (e.g., Group A). In some instances, external programmer 150 may configure IMD 110 with a program (e.g., Program I' of Group B) that is completely different from a set of programs configured at IMD 110 (e.g., Program I of Group B).

External programmer 150 may perform a stimulation parameter adjustment that changes a set of stimulation parameters of an existing program. For example, external programmer 150 may automatically, semi-automatically, or based on a user selection, may determine or more stimulation parameter adjustments for an existing program. In this example, external programmer 150 may pass through the one or more parameter adjustments for the existing program. For instance, external programmer 150 may determine a parameter adjustment (e.g., receive the adjustment from a user input from a health professional) that sets an intensity value of a particular stimulation parameter of program I of Group A and may relay the parameter adjustment to IMD 110.

Rather than relying on a determination of one or more stimulation parameter adjustments for the existing program (e.g., from a healthcare processional) and passing through the set of parameter adjustments, techniques described herein may configure external programmer 150 to compare an existing program and an updated program to determine difference information. In some examples, external programmer 150 may output the updated program to an API executed by external programmer 150, which may cause external programmer 150 to compare the existing program and an updated program to determine difference information and to output the difference information to IMD 110. For instance, external programmer 150 may receive a program (e.g., new program IV of Group A) to be applied to patient 105. In this example, external programmer 150, with an API executed by external programmer 150, may compare the received program with an existing program (e.g., existing program IV of Group A, existing program V of Group A, etc.) to determine difference information and output the difference information instead of the complete set of parameters for the received program. In this way, an amount of data to be sent to IMD 110 to implement a received program may be reduced without relying on a user (e.g., a physician or clinician) or a device (e.g., external programmer 150) to identify an existing program to be modified.

External programmer 150 may be characterized as a physician or clinician programmer if external programmer 150 is primarily intended for use by a physician or clinician. In other cases, external programmer 150 may be characterized as a patient programmer if external programmer 150 is primarily intended for use by a patient. A patient programmer may be generally accessible to patient 105 and, in many cases, may be a portable device that may accompany patient 105 throughout the patient's daily routine. For example, a patient programmer may receive input from patient 105 when the patient wishes to terminate or change stimulation therapy. In general, a physician or clinician programmer may support selection and generation of programs by a clinician for use by IMD 110, whereas a patient programmer may support adjustment and selection of such programs by a patient during ordinary use. In other examples, external programmer 150 may include, or be part of, an external charging device that recharges a power source of IMD 110. In this manner, a user may program and charge IMD 110 using one device, or multiple devices.

IMD 110 and external programmer 150 may exchange information and may communicate via wireless communication using any techniques known in the art. Examples of communication techniques may include, for example, radiofrequency (RF) telemetry and inductive coupling, but other techniques are also contemplated. In some examples, external programmer 150 includes a communication head that may be placed proximate to the patient's body near the IMD 110 implant site to improve the quality or security of communication between IMD 110 and external programmer 150. Communication between external programmer 150 and IMD 110 may occur during power transmission or separate from power transmission.

IMD 110, in response to commands from external programmer 150, may deliver electrical stimulation therapy according to one or more therapy stimulation programs, or a group of programs to a target tissue site of the spinal cord 120 of patient 105 via electrodes 132 on leads 130. In some examples, IMD 110 automatically modifies therapy stimulation programs as therapy needs of patient 105 evolve over time. For example, the modification of the therapy stimulation groups or programs may cause the adjustment of at least one parameter of the plurality of stimulation pulses.

In accordance with the techniques of the disclosure, external programmer 150 may be configured to use difference information. For example, external programmer 150, with an API, may receive difference information indicating a subset of a plurality of stimulation parameters to control delivery of the stimulation to the patient. In this example, external programmer 150 (e.g., a local programmer or a remote programmer) may determine an updated program or an updated group of programs indicating the plurality of stimulation parameters, and generate difference information based on a difference or differences between stimulation parameters of the updated program and stimulation parameters of an existing program or between stimulation parameters of an updated group of programs and an existing group of programs. External programmer 150 may communicate the difference information to IMD 110 to cause IMD 110 to apply the stimulation parameters for the updated program or the updated group of programs without communicating the entire update program. Again, the updated program or group of programs could be specified by user input at the local programmer or remote programmer, or selected automatically by the local programmer or remote programmer in response to patient input (e.g., a need to void, or an intention to stand up) or sensor input (e.g., an accelerometer indicates patient 150 is standing up).

IMD 110 may use the difference information to update one or more stimulation parameters of an existing program or existing group stored in the IMD and configure delivery of stimulation to patient 105 with the plurality of stimulation parameters defined by the updated program or updated group of programs. Hence, in some examples, external programmer 150 may transmit only the difference information to IMD 110, and not the entire updated group or program, so that IMD 110 may partially modify the existing group using the difference information to conform to the updated group. In the above example, instead of external programmer 150 outputting the plurality of stimulation parameters (e.g., a complete set of stimulation parameters for the updated program) to IMD 110 may stimulation parameters output the difference information to IMD 110.

For example, external programmer 150, with an API, may generate the difference information based on a comparison of an updated program (e.g., received from a remote device) and an existing program configured at IMD 110. For example, if the updated program only changes a polarity for a set of electrodes, external programmer 150 (or another device of system 100) may generate and communicated to IMD 110 the difference information to indicate the polarity for the set of electrodes and omit other stimulation parameters in the information that is communicated to IMD 110. External programmer 150 may configure IMD 110 with the updated program using the difference information, which may configure IMD 110 with the updated program in less time than systems that configure the medical device with communication of the entire updated program. For example, IMD 110 may generate stimulation parameters for an updated program using difference information and an existing program stored by IMD 110. For example, IMD 110 may generate the stimulation parameters for the updated program that matches the existing program with changes specified by the difference information.

Additionally, or alternatively, techniques of the disclosure may use a data structure (e.g., a table) group of programs in external programmer 150 to allow a selection of a group or program from one or more pre-stored groups of programs for programming of IMD 110. For example, a remote server or remote client may "pre-prepare" external programmer 150 with a data structure of pre-configured groups of programs (e.g., tens, hundreds, or thousands of groups of programs). For instance, the pre-stored groups of programs may be configured to provide broad therapy for one or more diseases, disorders, or injuries. After pre-preparing external programmer 150 with the pre-stored groups of programs, the remote server or remote client (e.g., with an algorithm, responsive to input form a health provider, etc.) may select a group from the stored group stored at external programmer 150. In this example, rather than transmitting the entire set of stimulation parameters for the selected group, the remote server or remote client may transmit an indication of the selected group (e.g., an identifier for the selected group) that is pre-stored in external programmer 150. In this example, external programmer 150 may configure IMD 110 using the indication of the selected group and the pre-stored groups of programs. For example, external programmer 150 may transmit a complete set of stimulation parameters for one or more programs of the selected group of programs. In response, IMD 110 may store the complete set of stimulation parameters for one or more programs of the selected group of programs and apply stimulation to a patient with the complete set of stimulation parameters stored at IMD 110 that correspond with the selected group. In some examples, IMD 110 may be configured to transmit difference information to the IMD 110 for the selected group of programs. In this example, IMD 110 may determine, using the difference information, the complete set of stimulation parameters that correspond with the selected group and apply stimulation to a patient with the complete set of stimulation parameters.

Configuring external programmer 150 to use difference information determined based on one or more difference between an updated program and an existing program and/or pre-stored groups of programs may improve a performance of IMD 110. For example, IMD 110 may be configured with programs in response to a patient activity (e.g., sitting down, standing up, or initiating a bodily function) faster than systems that rely on sending a complete set of stimulation parameters, which may improve a therapy provided to the patient. Again, the updated program or pre-stored groups of programs could be specified by user input at the local programmer or remote programmer, or selected automatically by the local programmer or remote programmer in response to patient input (e.g., a need to void, or an intention to stand up) or sensor input (e.g., an accelerometer indicates patient 150 is standing up). For instance, rather than a system taking a relatively long time (e.g., 30 seconds) to communicate to an IMD 110*a* full program or program group to accommodate a change in patient activity (e.g., sitting to walking), techniques described herein for using difference information and/or pre-stored groups of programs may permit the system to accommodate the change in patient activity based on a sensed condition, a user input, or the sensed condition and the user input in a relatively short amount of time (e.g., sub-second).

Furthermore, transmitting the difference information and/or a selection of a group of programs instead of a complete set of stimulation parameters may provide a failsafe and/or fault tolerance to a loss of connectivity in the system. Examples of loss of connectivity may occur between external programmer 150 and IMD 110, between external programmer 150 and a remote device (e.g., a remote client device or a remote server used for remote programming), or between other devices. For example, transmitting the difference information and/or sending a group identifier may comprise sending less data than sending a complete set of stimulation parameters, which may result in IMD 110 being configured with a program in less time. Configuring IMD 110 in less time may result in the IMD 110 being more fault tolerant to infrequent loss of connectivity in a network or telemetry link.

In some examples, the configuring the pre-stored groups of programs may be atomic. For example, external programmer 150 may receive and store an entire data structure (e.g., a table) for the pre-stored groups of programs before configuring IMD 110 with a group of the pre-stored groups of programs. For example, external programmer 150 and/or IMD 110 may continue to provide a patient with a treatment using an initial group of programs while receiving the pre-stored groups of programs. In this example, external programmer 150 and/or IMD 110 may continue to provide the patient with the treatment using the initial group during a loss of connectivity in the system. When connectivity is restored, external programmer 150 may restart the download of the entire pre-stored groups of programs or continue the download of the pre-stored groups of programs to receive the entire pre-stored groups of programs. Once the entire pre-stored groups of programs is received and stored at external programmer 150, external programmer 150 may send data or instructions to configured IMD 110 to deliver stimulation to provide a patient with a treatment using a group of the pre-stored groups of programs. In this way, IMD 110 and/or external programmer 150 may be fault tolerant.

More specifically, because the group identifier may be a single command (e.g., an index) rather than a set of stimulation parameters, external programmer 150 may fully execute the single command if successfully transmitted or selected by a user. Additionally, external programmer 150 may not execute a command to change all stimulation parameters of the pre-stored group of programs if the transmission was unsuccessful. If unsuccessful, a remote device and external programmer 150 may attempt to retry to transmit the command to change all stimulation parameters of the pre-stored group of programs. Techniques to use a group identifier may help to avoid partial parameter changes to the patient that could be detrimental to their therapy.

Moreover, transmitting the difference information and/or a selection of a group of programs instead of a complete set of stimulation parameters may reduce an amount of data transmitted to external programmer 150 and/or IMD 110, which may reduce a power consumption of external programmer 150 and/or IMD 110. Reducing the power consumption of external programmer 150 and/or IMD 110 may reduce a number of times a battery of external programmer 150 and/or IMD 110 is discharged and charged in a period of time, which may increase an amount of time that external programmer 150 and/or IMD 110 may be used for a patient. Increasing an amount of time that IMD 110 may be used, may improve a therapy for a patient, particularly because IMD 110 is implanted. Further, reducing the power consumption of external programmer 150 and/or IMD 110 may reduce an amount of time that a patient may spend charging the medical device, which may improve a patient satisfaction.

Figure 2:
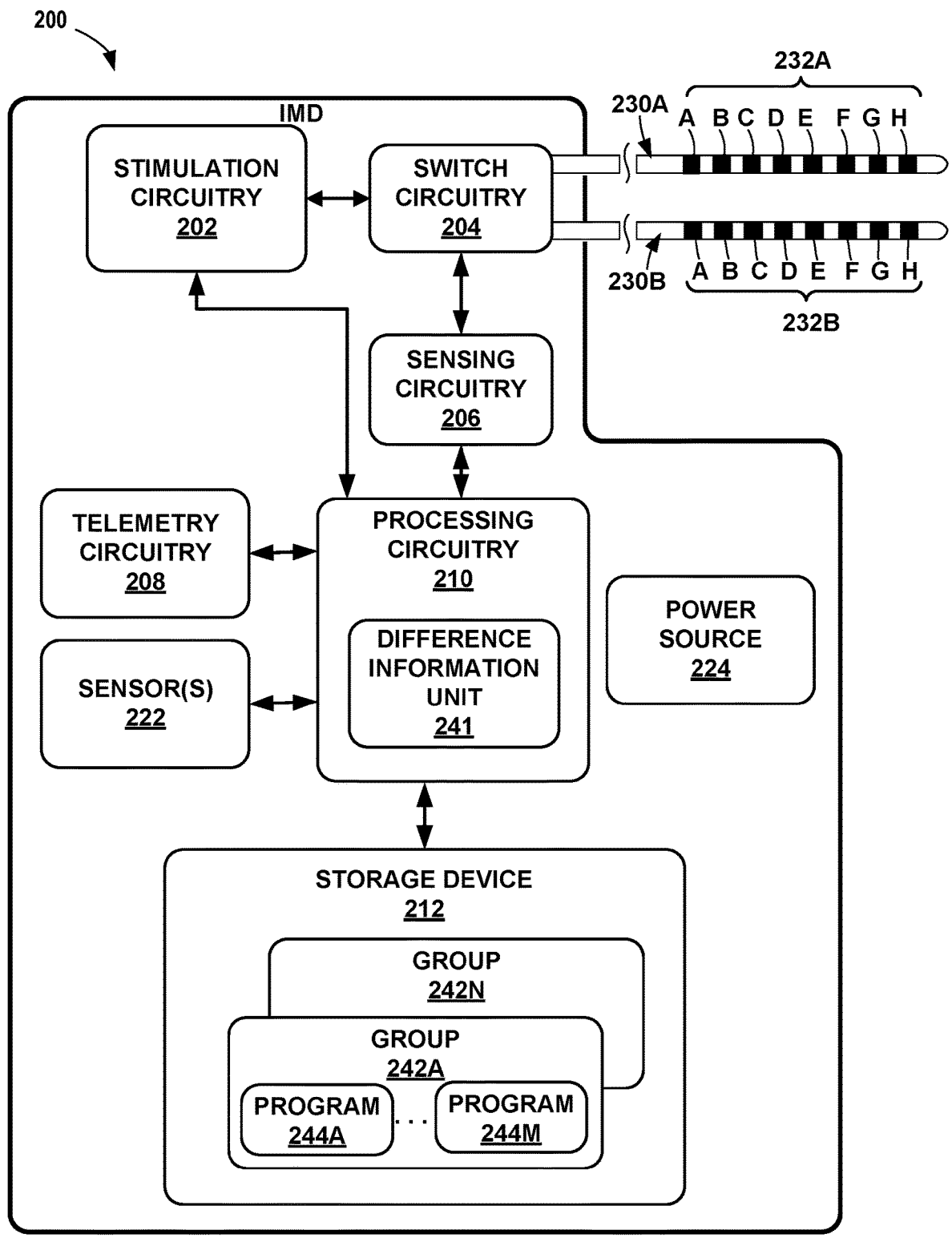
FIG. 2 is a block diagram illustrating an example of an IMD in the form of a neurostimulation device, in accordance with one or more techniques of this disclosure.

FIG. 2 is a block diagram illustrating an example configuration of components of an IMD 200, in accordance with one or more techniques of this disclosure. IMD 200 may be an example of IMD 110 of FIG. 1. In the example shown in FIG. 2, IMD 200 includes stimulation generation circuitry 202, switch circuitry 204, sensing circuitry 206, telemetry circuitry 208, processing circuitry 210, storage device 212, sensor(s) 222, power source 224, lead 230A carrying electrodes 232A, which may correspond to lead 130B and electrodes 130B of FIG. 1, and lead 230B carrying electrodes 232B, which may correspond to lead 130B and electrodes 130B of FIG. 1.

In the example shown in FIG. 2, storage device 212 stores N number of groups 242A-242N (collectively, groups 242), where each group of groups 242 may include M number of programs 244A-244M (collectively, programs 244). In some examples, groups 242 may include a different number of programs. In some examples, programs 244 of groups 242 may include stimulation parameter values (sometimes referred to as "sets of therapy parameters") for respective different stimulation programs selectable by the clinician or patient for therapy. In this manner, each stored therapy stimulation program, or set of stimulation parameter values, of programs 244 of groups 242 defines values for a set of electrical stimulation parameters (e.g., a stimulation parameter set), such as a electrode combination, current or voltage amplitude, pulse width, and pulse rate. In some examples, programs 244 of groups 242 may further include cycling information indicating when or how long stimulation is turned on and off.

Stimulation generation circuitry 202 may generate electrical stimulation pulses selected to alleviate symptoms or dysfunction of one or more diseases, disorders, injuries, or syndromes. While stimulation pulses are described, stimulation signals may take other forms, such as continuous-time signals (e.g., sine waves) or the like. Each of leads 230A, 230B may include any number of electrodes 232A, 232B. In the example of FIG. 2, each set of electrodes 232A, 232B includes eight electrodes A-H. In some examples, the electrodes are arranged in bipolar combinations. A bipolar electrode combination may use electrodes carried by the same lead 230A, 230B or different leads. For example, an electrode A of electrodes 232A may be a cathode and an electrode B of electrodes 232A may be an anode, forming a bipolar combination.

Switch circuitry 204 may include one or more switch arrays, one or more multiplexers, one or more switches (e.g., a switch matrix or other collection of switches), or other electrical circuitry configured to direct stimulation signals from stimulation generation circuitry 202 to one or more of electrodes 232A, 232B, or directed sensed signals from one or more of electrodes 232A, 232B to sensing circuitry 206. In some examples, each of the electrodes 232A, 232B may be associated with respective regulated current source and sink circuitry to selectively and independently configure the electrode to be a regulated cathode or anode, in which case switch circuitry 204 may not be necessary to direct stimulation signals to electrodes. Instead, current sourced or sunk by selected electrodes may be individually controlled. Stimulation generation circuitry 202 and/or sensing circuitry 206 also may include sensing circuitry to direct electrical signals sensed at one or more of electrodes 232A, 232B.

Sensing circuitry 206 may be configured to monitor signals from any combination of electrodes 232A, 232B. In some examples, sensing circuitry 206 includes one or more amplifiers, filters, and analog-to-digital converters. Sensing circuitry 206 may be used to sense electrophysiological signals. In some examples, sensing circuitry 206 detects electrophysiological signals from a particular combination of electrodes 232A, 232B. In some cases, the particular combination of electrodes for sensing electrophysiological signals includes different electrodes than a set of electrodes 232A, 232B used to deliver stimulation pulses. Alternatively, in other cases, the particular combination of electrodes used for electrophysiological sensing includes at least one of the same electrodes as a set of electrodes used to deliver stimulation pulses to patient 105. Sensing circuitry 206 may provide signals to an analog-to-digital converter, for conversion into a digital signal for processing, analysis, storage, or output by processing circuitry 210.

Telemetry circuitry 208 may support wireless communication between IMD 200 and an external programmer (not shown in FIG. 2) or another computing device under the control of processing circuitry 210. Processing circuitry 210 of IMD 200 may receive, as updates to programs, values for various stimulation parameters such as amplitude and electrode combination, from the external programmer via telemetry circuitry 208. Processing circuitry 210 may store updates to programs 244 of groups 242 or any other data in storage device 212. Telemetry circuitry 208 in IMD 200, as well as telemetry circuits in other devices and systems described herein, such as the external programmer, may accomplish communication by radiofrequency (RF) communication techniques. In addition, telemetry circuitry 208 may communicate with an external medical device programmer (not shown in FIG. 2) via proximal inductive interaction of IMD 200 with the external programmer. The external programmer may be one example of external programmer 150 of FIG. 1. Accordingly, telemetry circuitry 208 may send information to the external programmer on a continuous basis, at periodic intervals, or upon request from IMD 110 or the external programmer.

Processing circuitry 210 may include any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software or any combination thereof. Processing circuitry 210 controls stimulation generation circuitry 202 to generate stimulation signals according to programs 244 of groups 242 and any other instructions stored in storage device 212 to apply stimulation parameter values specified by one or more of programs, such as amplitude, pulse width, pulse rate, and pulse shape of each of the stimulation signals.

Processing circuitry 210 may use a group of programs stored in groups 242 to control stimulation generation circuitry 202 such that stimulation generation circuitry 202 applies the stimulation signals to selected combinations of electrodes 232A, 232B. For example, processing circuitry 210 may automatically or semi-automatically set or adjust programs 244 of groups 242. For instance, in response to a change in activity of a patient (e.g., standing, walking, voiding, etc.), processing circuitry 210 may automatically or semi-automatically set or adjust programs 244 of groups 242.

Difference information unit 241 of processing circuitry 210 may receive, e.g., from an external programmer, an indication of difference information indicating a "deltas" or changes between a program stored by groups 242 and an updated or new program. In this example, difference information unit 241 may modify or replace an existing program or an existing group of programs using the difference information. For example, if the difference information indicates the polarity for the set of electrodes and omits other stimulation parameters for a particular program stored by groups 242, difference information unit 241 may change the polarity for the set of electrodes in the particular program and maintain stimulation parameters of the program. In this example, difference information unit 241 may determine a program using only the difference information, without receiving the entire program. However, in some examples, external programmer 150 (or another device) may determine a program using difference information.

Storage device 212 may be configured to store information within IMD 200 during operation. Storage device 212 may include a computer-readable storage medium or computer-readable storage device. In some examples, storage device 212 includes one or more of a short-term memory or a long-term memory. Storage device 212 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 212 is used to store data indicative of instructions for execution by processing circuitry 210. As discussed above, storage device 212 is configured to store programs 244 of groups 242.

Power source 224 is configured to deliver operating power to the components of IMD 200. Power source 224 may include a battery and a power generation circuit to produce the operating power. In some examples, the battery is rechargeable to allow extended operation. In some examples, recharging is accomplished through proximal inductive interaction between an external charger and an inductive charging coil within IMD 200. Power source 224 may include any one or more of a plurality of different battery types, such as nickel cadmium batteries and lithium ion batteries.

In accordance with the techniques of the disclosure, processing circuitry 210 may receive an indication of a program (e.g., a complete set of stimulation parameters, difference information, a group identifier, etc.) from external programmer 150, a remote device (e.g., client device, remote server, etc.) and/or possibly any intermediate device. For example, processing circuitry 210 may receive a complete set of parameters for the program. In this example, processing circuitry 210 may apply (e.g., update or replace) the complete set of parameters to a parameter stored in programs 244 of groups 242. For instance, processing circuitry 210 may set program 244A of group 242A to match the complete set of parameters for received by processing circuitry 210.

Difference information unit 241 may receive difference information for a program from external programmer 150, a remote device (e.g., client device, remote server, etc.) and/or possibly any intermediate device. In this example, difference information unit 241 may modify or replace a program stored by programs 244 of groups 242 using the difference information. For example, if the difference information indicates the polarity for the set of electrodes and omits other stimulation parameters for a program 244A of group 242A, processing circuitry 210 may change the polarity for the set of electrodes in program 244A of group 242A and maintain other stimulation parameters of program 244A of group 242A. Again, in some examples, external programmer 150 (or another device) may determine a program using difference information. For instance, external programmer 150 or another device may translate the difference information into a complete set of parameters for the program and processing circuitry 210 may receive the complete set of parameters for the program. That is, in this example, difference information unit 241 may be omitted and/or bypassed by the external programmer (or another device) translating the difference information into a complete set of parameters for the program into the complete set of parameters for the program for use by processing circuitry 210.

Figure 3:
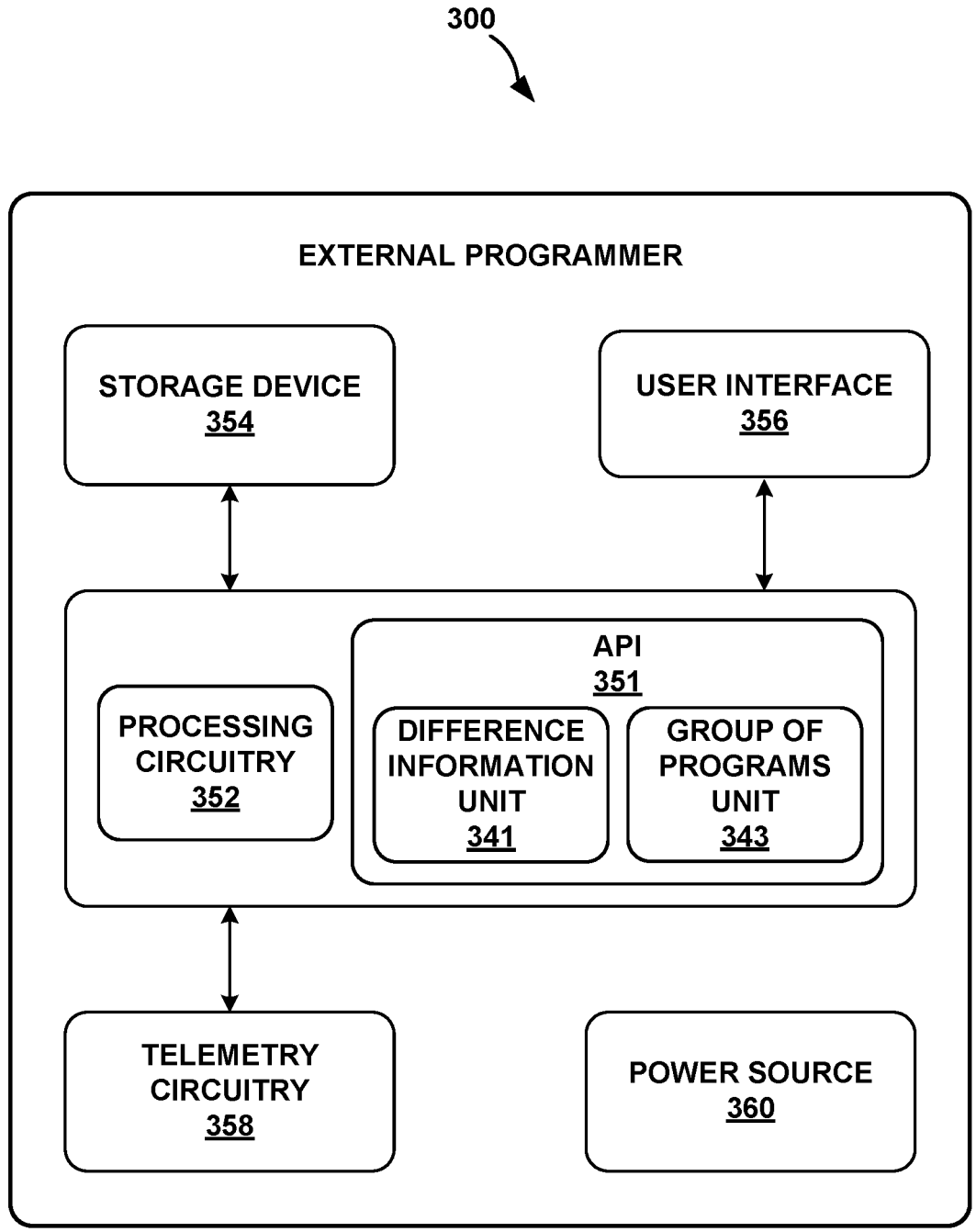
FIG. 3 is a block diagram illustrating an example of an external programmer suitable for use with the IMD of FIG. 2, in accordance with one or more techniques of this disclosure.

FIG. 3 is a block diagram illustrating an example configuration of components of an example external programmer 300. External programmer 300 may be an example of external programmer 150 of FIG. 1. Although external programmer 300 may generally be described as a hand-held device, external programmer 300 may be a larger portable device or a more stationary device. In addition, in other examples, external programmer 300 may be included as part of an external charging device or include the functionality of an external charging device. As illustrated in FIG. 3, external programmer 300 may include processing circuitry 352, storage device 354, user interface 356, telemetry circuitry 358, and power source 360. Storage device 354 may store instructions that, when executed by processing circuitry 352, cause processing circuitry 352 and external programmer 300 to provide the functionality ascribed to external programmer 300 throughout this disclosure. Each of these components, circuitry, or modules, may include electrical circuitry that is configured to perform some, or all of the functionality described herein. For example, processing circuitry 352 may include processing circuitry configured to perform the processes discussed with respect to processing circuitry 352. External programmer 300 may represent a patient programmer, clinician programmer, or another device.

In general, external programmer 300 includes any suitable arrangement of hardware, alone or in combination with software and/or firmware, to perform the techniques attributed to external programmer 300, and processing circuitry 352, user interface 356, and telemetry circuitry 358 of external programmer 300. In various examples, external programmer 300 may include one or more processors, such as one or more microprocessors, DSPs, ASICs, FPGAs, or any other equivalent integrated or discrete logic circuitry, as well as any combinations of such components. External programmer 300 also, in various examples, may include a storage device 354, such as RAM, ROM, PROM, EPROM, EEPROM, flash memory, a hard disk, a CD-ROM, including executable instructions for causing the one or more processors to perform the actions attributed to them. Moreover, although processing circuitry 352 and telemetry circuitry 358 are described as separate modules, in some examples, processing circuitry 352 and telemetry circuitry 358 are functionally integrated. In some examples, processing circuitry 352 and telemetry circuitry 358 correspond to individual hardware units, such as ASICs, DSPs, FPGAs, or other hardware units.

Storage device 354 (e.g., a storage device) may store instructions that, when executed by processing circuitry 352, cause processing circuitry 352 and external programmer 300 to provide the functionality ascribed to external programmer 300 throughout this disclosure. For example, storage device 354 may include instructions that cause processing circuitry 352 to obtain a parameter set from memory or receive user input and send a corresponding command to IMD 200, or instructions for any other functionality. In addition, storage device 354 may include a plurality of programs, where each program includes a parameter set that defines therapy stimulation or control stimulation. Storage device 354 may also store data received from a medical device (e.g., IMD 110). For example, storage device 354 may store data recorded at a sensing module of the medical device, and storage device 354 may also store data from one or more sensors of the medical device.

Processing circuitry 352 may be configured to control IMD 110 with a program or a group of programs to provide stimulation. For example, processing circuitry 352 may automatically or semi-automatically set or adjust programs at IMD 110 by transmitting, with telemetry circuitry 358, instructions to IMD 110. For instance, in response to a change (e.g., a change indicated by user input, a change sensed by IMD 110, etc.) in activity of a patient (e.g., standing, walking, voiding, etc.), processing circuitry 352 may automatically or semi-automatically set or adjust programs at IMD 110. For instance, processing circuitry 352 may, in response to determining that the patient would not like to void, output instructions to IMD 110 to use a first group stored at IMD 110 for controlled voiding. In this instance, processing circuitry 352 may, in response to determining that the patient would like to void, output instructions to IMD 110 to use a new group or program stored at IMD 110 for controlled voiding.

Processing circuitry 352 may implement API 351 to facilitate the control of IMD 110. For example, processing circuitry 352 may receive (e.g., from a remote device) difference information indicating a subset of a plurality of stimulation parameters to apply the stimulation to the patient. In this example, processing circuitry 352 may determine an updated program indicating the plurality of stimulation parameters based on an existing program and the difference information. Processing circuitry 352 may cause (e.g., by outputting one or more programming instructions) IMD 110 to apply the updated program to configure the medical device to apply stimulation to the patient with the plurality of stimulation parameters. For example, processing circuitry 352 may output the plurality of stimulation parameters to IMD 110.

In the above example, processing circuitry 352 generates the plurality of stimulation parameters from difference information. However, in some examples, processing circuitry 352 may generate difference information from the plurality of stimulation parameters. For example, processing circuitry 352 may receive a plurality of stimulation parameters for a program. For instance, processing circuitry 352 may receive a complete set of stimulation parameters or a partial set of stimulation parameters from an interaction with user interface 356 by a patient, caretaker, or health professional. In some examples, processing circuitry 352 may receive a complete set of stimulation parameters or a partial set of stimulation parameters from a remote device (e.g., a remote server or client device).

Processing circuitry 352 may output the stimulation parameters to API 351. In this example, processing circuitry 352, with execution of difference information unit 341 of API 351, may generate difference information based on a comparison of the program and an existing program configured at IMD 110. For example, if the stimulation parameters of the received program may only change a polarity for a set of electrodes from the existing program, difference information unit 341 of API 351 may generate the difference information to indicate the polarity for the set of electrodes and omit other stimulation parameters. Processing circuitry 352, with telemetry circuitry 358, may output the difference information to IMD 110, which may configure IMD 110 with the updated program in less time than systems that configure IMD 110 using the stimulation parameters (e.g., the complete set of stimulation parameters). Again, in some examples, external programmer 300 may instead output a complete set of stimulation parameters for the program and processing circuitry may receive the complete set of stimulation parameters for the program. That is, difference information unit 341 may be omitted. In another example, external programmer 300 may instead receive difference information from, for example, a remote device and output an indication of the difference information to IMD 110. That is, difference information unit 341 may pass through the received difference information and omit a process of generating the difference information.

Additionally, or alternatively, processing circuitry 352 may determine a program using group of programs unit 343 of API 351. For example, processing circuitry 352 may receive, with telemetry circuitry 358, an indication (e.g., an index, an identifier, etc.) of a selected group of programs of a pre-stored of programs instead of the complete set of stimulation parameters. In this example, processing circuitry 352 may determine, with group of programs unit 343 of API 351, the complete set of stimulation parameters from the indication of the selected group of programs. Processing circuitry 352 may output, with telemetry circuitry 358, the complete set of stimulation parameters. In some examples, processing circuitry 352 may instead receive, with telemetry circuitry 358, a complete set of stimulation parameters for the program and processing circuitry 352, with telemetry circuitry 358, may output the complete set of stimulation parameters for the program. That is, group of programs unit 343 may be omitted.

User interface 356 may include a button or keypad, lights, a speaker for voice commands, a display, such as a liquid crystal (LCD), light-emitting diode (LED), or organic light-emitting diode (OLED). In some examples the display includes a touch screen. User interface 356 may be configured to display any information related to the delivery of electrical stimulation. User interface 356 may also receive user input (e.g., indication of when the patient perceives a stimulation pulse) via user interface 356. The input may be, for example, in the form of pressing a button on a keypad or selecting an icon from a touch screen. The input may request starting or stopping electrical stimulation, the input may request a new spatial electrode pattern or a change to an existing spatial electrode pattern, of the input may request some other change to the delivery of electrical stimulation.

Telemetry circuitry 358 may support wireless communication between the medical device and external programmer 300 under the control of processing circuitry 352. Telemetry circuitry 358 may also be configured to communicate with another computing device via wireless communication techniques, or direct communication through a wired connection. In some examples, telemetry circuitry 358 provides wireless communication via an RF or proximal inductive medium. In some examples, telemetry circuitry 358 includes an antenna, which may take on a variety of forms, such as an internal or external antenna.

Examples of local wireless communication techniques that may be employed to facilitate communication between external programmer 300 and IMD 110 include RF communication according to the 802.11 or Bluetooth® specification sets or other standard or proprietary telemetry protocols. In this manner, other external devices may be capable of communicating with external programmer 300 without needing to establish a secure wireless connection. As described herein, telemetry circuitry 358 may be configured to transmit a spatial electrode movement pattern or other stimulation parameter values to IMD 110 for delivery of electrical stimulation therapy.

Power source 360 is configured to deliver operating power to the components of external programmer 300. Power source 360 may include a battery and a power generation circuit to produce the operating power. In some examples, the battery is rechargeable to allow extended operation. Recharging may be accomplished by electrically coupling power source 360 to a cradle or plug that is connected to an alternating current (AC) outlet. In addition, recharging may be accomplished through proximal inductive interaction between an external charger and an inductive charging coil within external programmer 300. In other examples, traditional batteries (e.g., nickel cadmium or lithium ion batteries) may be used. In addition, external programmer 300 may be directly coupled to an alternating current outlet to operate.

The architecture of external programmer 300 illustrated in FIG. 3 is shown as an example. The techniques as set forth in this disclosure may be implemented in the example external programmer 300 of FIG. 3, as well as other types of systems not described specifically herein. Nothing in this disclosure should be construed so as to limit the techniques of this disclosure to the example architecture illustrated by FIG. 3.

Figure 4:
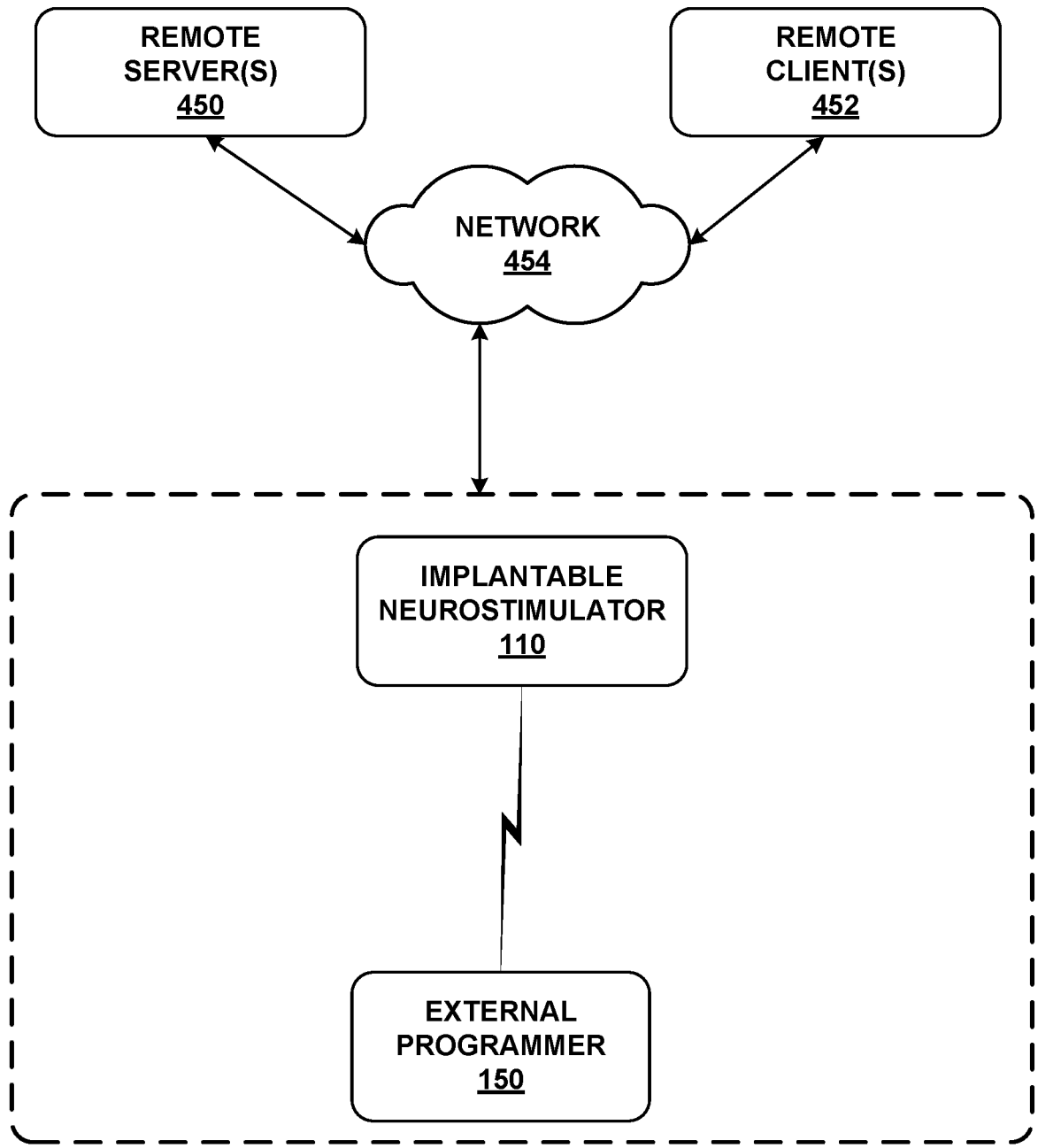
FIG. 4 is a block diagram illustrating an example of one or more remote server and one or more remote clients suitable for use with the IMD of FIG. 1, in accordance with one or more techniques of this disclosure.

FIG. 4 is a block diagram illustrating an example of one or more remote servers 450 (referred to herein as "remote server 450") and one or more remote clients 452 (referred to herein as "remote clients 452") suitable for use with the IMD of FIG. 1, in accordance with one or more techniques of this disclosure. Remote server 450 may represent a Cloud computing infrastructure. Remote client 452 may represent a clinician device geographically remote from external programmer 150 and/or IMD 110. For instance, remote client 452 may be used by a health professional at a doctor's office and the patient and IMD 110 may be at a home of the patient. Remote server 450 and/or remote client 452 may be referred to herein as a remote device. Network 454 may comprise one or more wired (e.g., Ethernet) and/or wireless networks (e.g., Wi-Fi™, Bluetooth™, Zigbee™, IEEE 802.11, etc.). In some examples, network 454 may comprise the Internet.

A remote device (e.g., remote server 450 and/or remote client 452) may be configured to control IMD 110 with a program or a group of programs to provide stimulation. For example, the remote device may automatically or semi-automatically set or adjust programs at IMD 110. For instance, in response to a change in activity of a patient (e.g., standing, walking, voiding, etc.), the remote device may automatically or semi-automatically set or adjust programs at IMD 110. For instance, the remote device may receive sensor information or user input information from IMD 110 or external programmer 150 via the network 454 that indicates a change in activity of the patient.

A remote device (e.g., remote server 450 and/or remote client 452) may output stimulation parameters to configure IMD 110. For example, the remote device may output a complete set of stimulation parameters for each program of a group of programs to provide a treatment to a patient.

In accordance with the techniques of the disclosure, a remote device (e.g., remote server 450 and/or remote client 452) may automatically or semi-automatically determine an updated program based on sensor input or user input. In this example, the remote device (e.g., with an API at the remote device) may generate difference information based on a comparison of the updated program and an existing program configured at IMD 110. For example, if the updated program only changes a polarity for a set of electrodes, the remote device may generate the difference information to indicate the polarity for the set of electrodes and omit other stimulation parameters. External programmer 150 may configure IMD 110 with the updated program using the difference information, which may configure IMD 110 with the updated program in less time than systems that configure the medical device with the entire updated program. In this way, system may respond to a patient activity (e.g., standing up) faster than systems that rely on sending a complete set of stimulation parameters, which may improve a therapy provided to the patient. For instance, rather than a system to take a relatively long time (e.g., 30 seconds) to accommodate a change in patient activity (e.g., sitting to walking), techniques described herein for using difference information may permit the system to accommodate the change in patient activity in a relatively short amount of time (e.g., seconds).

Additionally, or alternatively, a remote device (e.g., remote server 450 and/or remote client 452) may be configured to use pre-stored groups of programs to allow a selection of a program. For example, the remote device may "pre-prepare" external programmer 150 with pre-stored groups of programs (e.g., tens, hundreds, or thousands of groups of programs). For instance, the pre-stored group may be configured to provide broad therapy for one or more diseases. After pre-preparing external programmer 150 with the pre-stored groups of programs, the remote device (e.g., with an algorithm, responsive to input from a health provider, based on a sensed input, based on a user input, etc.) may select a group from the pre-stored groups of programs stored at external programmer 150. In this example, rather than transmitting the entire set of stimulation parameters for the selected group, remote device may transmit an indication of the selected group (e.g., an identifier for the selected group), e.g., a selected group pre-stored in a storage device of external programmer 150. In this example, external programmer 150 may configure IMD 110 using the indication of the selected group and the pre-stored groups of programs. For example, external programmer 150 may generate a complete set of stimulation parameters for the selected group. In this example, external programmer 150 may configure IMD 110 with the complete set of stimulation parameters for the group. For instance, external programmer 150 may transmit programming instructions to IMD 110 that causes IMD 110 to configure a program of a group with the complete set of stimulation parameters.

In this way, IMD 110 may respond to a patient activity (e.g., standing up) faster than systems that rely on sending a complete set of stimulation parameters, which may improve a therapy provided to the patient. In this example, external programmer 150 stores the pre-stored group and generates a complete set of stimulation parameters for the selected group. However, in some examples, IMD 110 may store the pre-stored group and generate the complete set of stimulation parameters for the selected group. For instance, external programmer 150 may be bypassed such that the remote device either communicates to IMD 110 via network 454 and without external programmer 150. In some instances, external programmer 150 may pass-through the indication of the selected group to IMD 110 such that external programmer 150 relays the indication of the selected group without generating and/or outputting the complete set of stimulation parameters for the selected group to IMD 110.

Furthermore, transmitting the difference information and/or a selection of a group of programs instead of a complete set of stimulation parameters may provide a failsafe and/or fault tolerance to a loss of connectivity in the system. Examples of loss of connectivity may occur between external programmer 150 and IMD 110, between external programmer 150 and a remote device (e.g., a remote client device or a remote server used for remote programming), or between other devices. For example, transmitting the difference information may comprise sending less data than sending a complete set of stimulation parameters, which may result in IMD 110 being configured with a program in less time. Configuring IMD 110 in less time may result in the IMD 110 being more fault tolerant to infrequent loss of connectivity in network 454 or a telemetry link.

Although shown as separate entities, in some examples, functionality may be distributed differently than that shown in FIG. 4. For example, remote server 450 and remote client 452 may be the same system.

Figure 5:
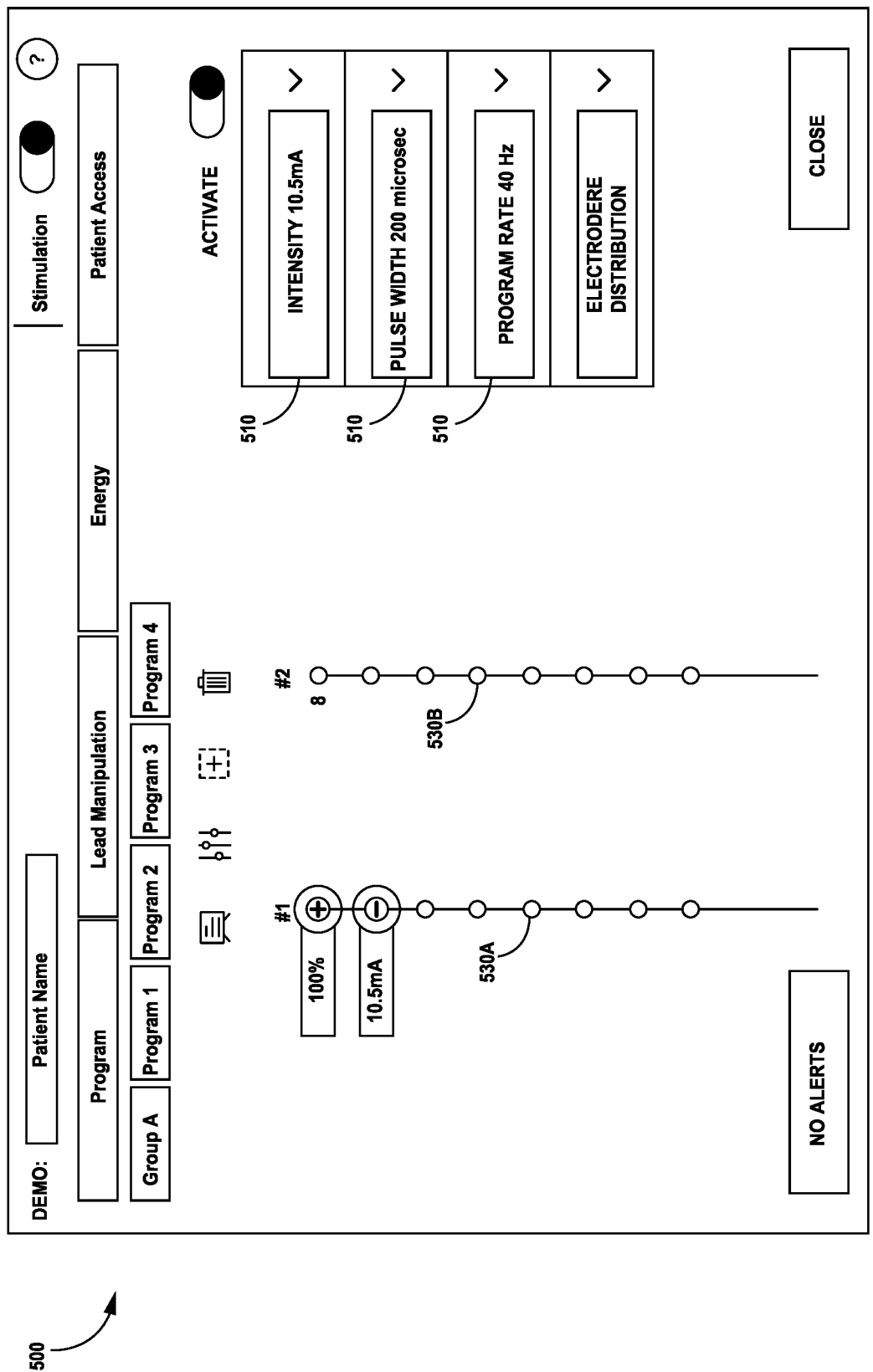
FIG. 5 is a user interface diagram of a user interface for inputting stimulation parameters, in accordance with one or more techniques of this disclosure.

FIG. 5 is a user interface diagram of a user interface for inputting stimulation parameters, in accordance with one or more techniques of this disclosure. User interface 500 may form part of external programmer 150, a remote device (e.g., remote server 450 or remote client 452, or another device.

User interface 500 may include a display, for example comprising an LCD or LED display, and an input such as a keyboard, keypad, or touch screen. A user (e.g., a patient, caretaker, or health professional) may interact with user interface 500. The user may also interact using peripheral pointing devices, such as a stylus scroll wheel, mouse, or any combination of such devices. The input may include parameter adjustment inputs 510 and/or electrode selection inputs 530A, 530B. Electrode selection inputs 530A, 530B may allow the user to input which particular electrode to be used and/or to specify the polarity of the electrodes. The user may use a single click for one polarity and double click for the other polarity. User interface 500 may be configured to receive an input of a pain rating and/or a sensory rating.

Parameter adjustment inputs 510 may allow for a user (e.g., a patient, caretaker, or health professional) to modify stimulation parameters and visualize what stimulation parameters are currently implemented. Stimulation parameters may include a selection of one or more electrodes, a polarity of each selected electrode, a voltage or current amplitude, a pulse width, a pulse frequency, or other stimulation parameters. In some examples, stimulation parameters may include additional stimulation parameters than shown in FIG. 5 and/or may omit one or more stimulation parameters shown in FIG. 5.

User interface 500 may direct IMD 110 to test a number of parameter combinations and may allow the user to identify particular parameter combinations that provide efficacious results. User interface 500 may direct IMD 110 to test a particular parameter at a particular value or range of values using the parameter adjustment inputs 510. User interface 500 may receive an input from the user to manually select stimulation parameters. User interface 500 may receive a select from a user of a program or group of programs for automatically identifying parameter, combination of stimulation parameters, and stimulation parameter to test. User interface 500 may input an indication of whether effective stimulation parameters have been selected for the patient, e.g., if the selected stimulation parameters produce stimulation that support therapeutic efficacy, e.g., alleviating or reducing symptoms of a disease or disorder, or delaying the onset of symptoms or tissue damage or degeneration due to the disease or disorder. User interface 500 may control IMD 110 test stimulation with a set of stimulation parameters, for example multiple sets of stimulation parameters. User interface 500 may display a recommended set of stimulation parameters to test.

User interface 500 may receive an indication of a selection by a user (e.g., a patient, caretaker, or a health professional) of various stimulation parameters such as electrode combination, a polarity of each selected electrode, a voltage or current amplitude, a pulse width, and a pulse frequency. In some examples, user interface 500 may output a program for the stimulation parameters to an API (e.g., API 351), which may use techniques described herein to determine difference information and/or a selected group from pre-stored groups of programs (e.g., a group identifier).

User interface 500 may receive an indication of a selection by a user (e.g., a patient, caretaker, or health professional) of a combination of stimulation parameters, such as a program or a group of programs. For example, user interface 500 may receive an indication of one or more user inputs selecting an intensity value and pulse width value at first test values. Again, external programmer 150 and/or remote device may or automatically determine a combination of stimulation parameters based on sensor input or user input, where changes or groups are designated for different sensor conditions or user indicated conditions.

External programmer 150 and/or a remote device (e.g., remote server 450 and/or remote client 482) may receive the user input and direct stimulation to IMD 110 using the intensity level at the first test values. In some examples, user interface 500 may output the combination of stimulation parameters to an API (e.g., API 351), which may use techniques described herein to determine difference information and/or a selected group from pre-stored groups of programs.

User interface 500 may allow for a user to receive information and to input information for external programmer 150 and/or a remote device (e.g., remote server 450 and/or remote client 482) that directs IMD 110 to automatically or semi-automatically generate or select a program or group of programs. In this example, user interface 500 may output a combination of stimulation parameters for the program or group of programs to an API (e.g., API 351), which may use techniques described herein to determine difference information and/or a selected group from pre-stored groups of programs.

Figure 6:
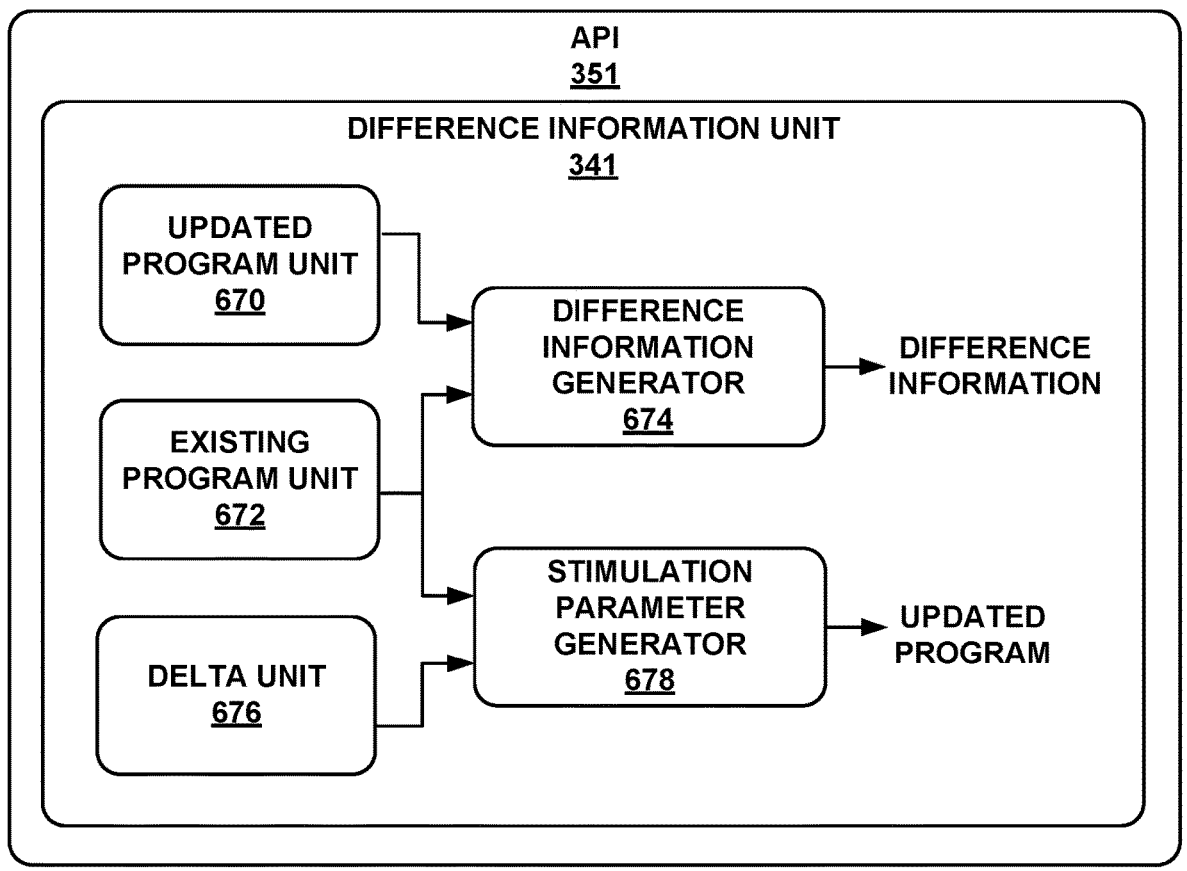
FIG. 6 is a block diagram illustrating an example of program components configured for difference information, in accordance with one or more techniques of this disclosure, in accordance with one or more techniques of this disclosure.

FIG. 6 is a block diagram illustrating an example of program components configured for difference information, in accordance with one or more techniques of this disclosure, in accordance with one or more techniques of this disclosure. The example of FIG. 6 is refers to FIGS. 1-5 for example purposes only. In this example, difference information unit 341 of API 351 is implemented in external programmer 150. However, in some examples, aspects of difference information unit 341 of API 351 may be implemented at a remote device (e.g., remote server 450 or client device 452), IMD 110, or another device.

A first device (e.g., a remote device or external programmer 150) may be configured with updated program unit 670, existing program unit 672, and difference information generator 674 and omit delta unit 676 and stimulation parameter generator 678. Similarly, a second device (e.g., external programmer 150 or IMD 110) may be configured with existing program unit 672, delta unit 676, and stimulation parameter generator 678 and omit updated program unit 670 and difference information generator 674. In some examples, however, a single device (e.g., external programmer 150) may be configured with existing program unit 672, delta unit 676, stimulation parameter generator 678, updated program unit 670, and difference information generator 674.

In the example of FIG. 6, difference information unit 341 of API 351 may be configured to convert stimulation parameters into difference information. For example, updated program unit 670 may receive a complete set of stimulation parameters. For example, updated program unit 670 may receive an indication of a selection by user (e.g., a patient, a caretaker, or a health professional) of a complete set of stimulation parameters. In some examples, updated program unit 670 may receive a complete set of stimulation parameters from a remote device (e.g., remote server 450 or client device 452) or another device. The remote device, external programmer 150, and/or IMD 110 may automatically or semi-automatically determine the complete set of stimulation parameters based on sensor input or user input, where changes or groups are designated for different sensor conditions or user indicated conditions.

Existing program unit 672 may store or maintain existing program information. In some examples, existing program unit 672 may maintain group of existing programs that are stored at IMD 110. For instance, existing program unit 672 may maintain the group of existing programs to include programs used by IMD 110 to provide stimulation to the patient. In some instances, existing program unit 672 may maintain the group of existing programs to include programs stored by IMD 110 but not currently used by IMD 110 to provide stimulation to the patient.

Difference information generator 674 may compare an updated program output by updated difference information generator 674 with an existing program stored by existing program unit 672. For example, difference information generator 674 may compare each stimulation parameter of an existing program with a corresponding stimulation parameter of the updated program. In response to determining that the stimulation parameter of an existing program does not match the corresponding stimulation parameter of the updated program, difference information generator 674 may generate difference information to include an indication of the corresponding stimulation parameter. For instance, if the updated program has a first intensity value for an electrode that is different than (e.g., less than or greater than) a second intensity value for the electrode of the existing program, difference information generator 674 may generate difference information to include the first intensity value.

Delta unit 676 and stimulation parameter generator 678 may perform a reciprocal process of updated program unit 670 and difference information generator 674. For example, delta unit 676 may receive difference information. For example, delta unit 676 may receive difference information from a remote device (e.g., remote server 450 or client device 452) or another device. Stimulation parameter generator 678 may generate stimulation parameters for an updated program using difference information and an existing program stored by existing program unit 672. For example, stimulation parameter generator 678 may generate the stimulation parameters for the updated program that matches the existing program with changes specified by the difference information.

Figure 7:
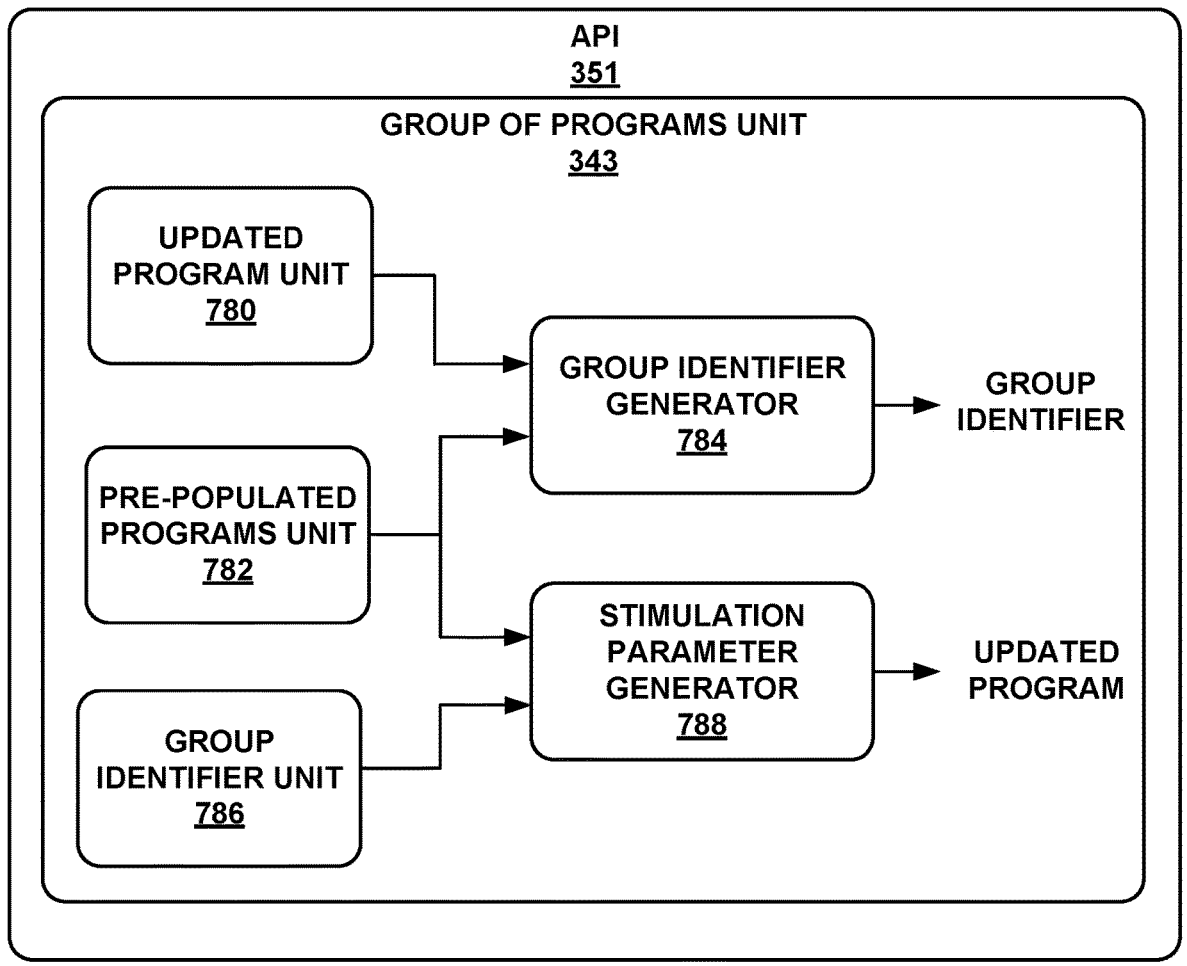
FIG. 7 is a block diagram illustrating an example of program components suitable configured for using a selection of a group from a pre-stored group of a group of programs, in accordance with one or more techniques of this disclosure, in accordance with one or more techniques of this disclosure.

FIG. 7 is a block diagram illustrating an example of program components suitable configured for using a selection of a group from a pre-stored group of a group of programs, in accordance with one or more techniques of this disclosure, in accordance with one or more techniques of this disclosure. The example of FIG. 7 is refers to FIGS. 1-6 for example purposes only. In this example, group of programs unit 343 of API 351 is implemented in external programmer 150. However, in some examples, aspects of group of programs unit 343 of API 351 may be implemented at a remote device (e.g., remote server 450 or client device 452), IMD 110, or another device.

A first device (e.g., a remote device) may be configured with updated program unit 780, pre-populated programs unit 782, and group identifier generator 784 and omit group identifier unit 786 and stimulation parameter generator 788. Similarly, a second device (e.g., external programmer 150) may be configured with pre-populated programs unit 782, group identifier unit 786, and stimulation parameter generator 788 and omit updated program unit 780 and group identifier generator 784. In some examples, however, a single device may be configured with updated program unit 780, pre-populated programs unit 782, group identifier generator 784, group identifier unit 786, and stimulation parameter generator 788.

In the example of FIG. 7, group of programs unit 343 of API 351 is configured to identify stimulation parameters using pre-stored groups of programs. For example, updated program unit 780 may receive a complete set of stimulation parameters. For example, updated program unit 780 may receive an indication of a selection by user (e.g., a patient, a caretaker, or a health professional) of a complete set of stimulation parameters. In some examples, updated program unit 780 may receive a complete set of stimulation parameters from a remote device (e.g., remote server 450 or client device 452) or another device. The remote device, external programmer 150, and/or IMD 110 may automatically or semi-automatically determine the complete set of stimulation parameters based on sensor input or user input, where changes or groups are designated for different sensor conditions or user indicated conditions.

Pre-populated programs unit 782 may manage pre-stored groups of programs (e.g., tens, hundreds, or thousands of groups of programs). For instance, the pre-stored group may be configured to provide broad therapy for one or more diseases. In some examples, pre-populated programs unit 782 may update the pre-stored groups of programs. In some examples, pre-populated programs unit 782 may atomically updating the pre-stored groups of programs. For instance, while receiving a set of changes to the updated table, pre-populated programs unit 782 may refrain from applying any changes of the set of changes to the pre-stored group until all of the changes of the set of changes has been received. Again, pre-populated programs unit 782 may receive the set of changes for the pre-stored group from an indication of a selection by user (e.g., a patient, a caretaker, or a health professional) of a complete set of stimulation parameters, a remote device (e.g., remote server 450 or client device 452), or another device. The remote device, external programmer 150, and/or IMD 110 may automatically or semi-automatically determine the complete set of changes for the pre-stored group based on sensor input or user input, where changes or groups are designated for different sensor conditions or user indicated conditions.

Group identifier generator 784 may generate an identifier for the updated program output by the updated program unit 780 using the pre-stored group managed by pre-populated programs unit 782. For example, group identifier generator 784 may generate an identifier that maps the updated program to a set of programs of the table.

Group identifier unit 786 and stimulation parameter generator 788 may perform a reciprocal process of updated program unit 780 and group identifier generator 784. For example, group identifier unit 786 may receive group identifier. For example, group identifier unit 786 may receive a group identifier unit 786 from a remote device (e.g., remote server 450 or client device 452) or another device.

Stimulation parameter generator 788 may generate stimulation parameters for an updated program using a group identifier and a pre-stored group managed by pre-populated programs unit 782. For example, stimulation parameter generator 788 may generate the stimulation parameters for the updated program that maps the group identifier to a set of programs of the table.

Figure 8:
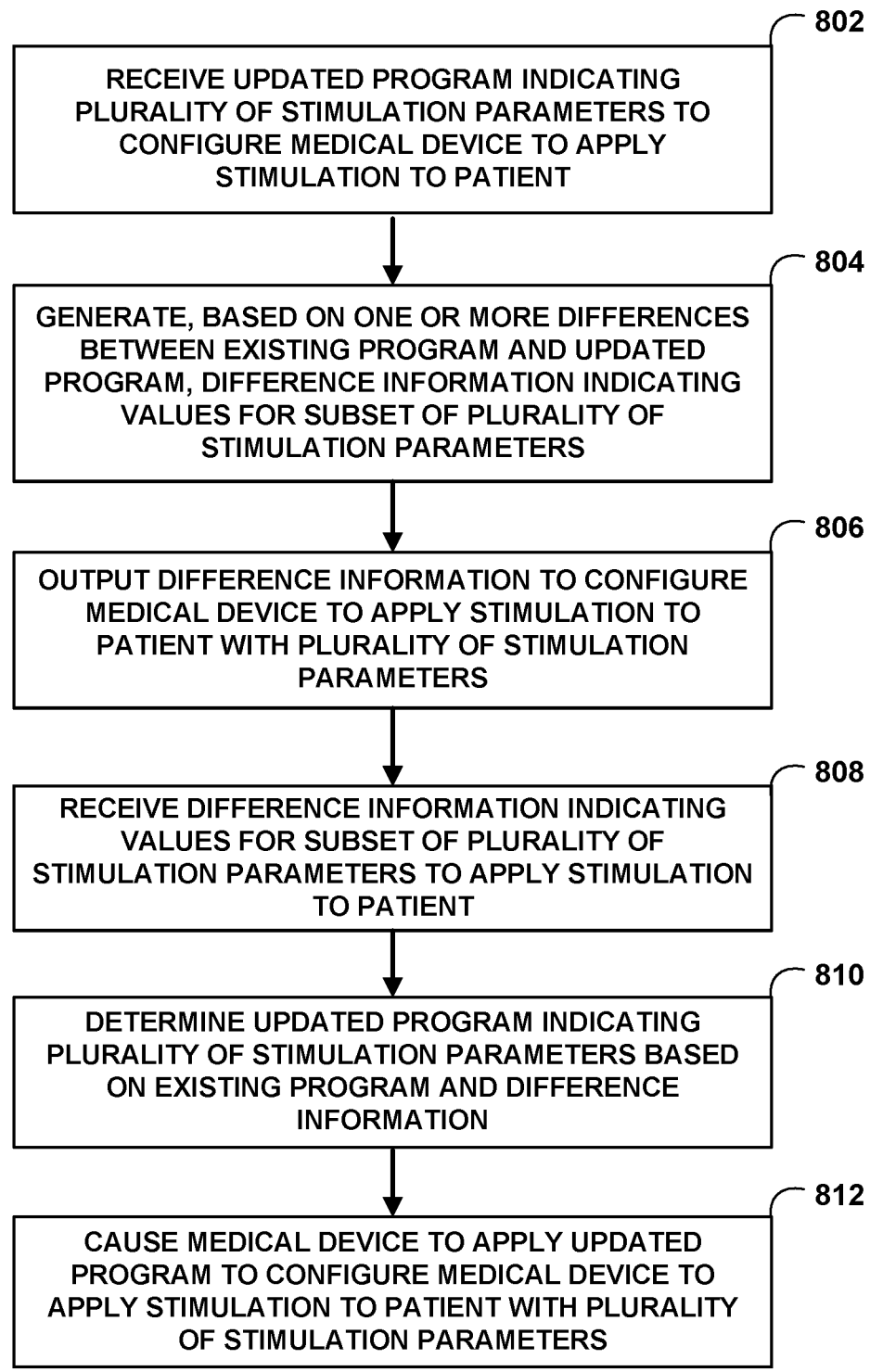
FIG. 8 is a flow diagram illustrating a process for using difference information, in accordance with one or more techniques of this disclosure.

FIG. 8 is a flow diagram illustrating a process for using difference information, in accordance with one or more techniques of this disclosure. FIG. 8 is discussed with reference to FIGS. 1-7 for example purposes only. In the following example, external programmer 150 performs 802-806 of FIG. 8 and IMD 110 performs 808-812. However, in other examples, other devices may perform the process of FIG. 8 as explained in further detail below. In the following examples, IMD 110 is used as a medical device. However, in some examples, an external medical device may be used instead of IMD 110.

External programmer 150 may receive an updated program indicating a plurality of stimulation parameters to configure IMD 110 to apply the stimulation to the patient (802). For example, to receive the updated program, external programmer 150 may automatically or semi-automatically determine the updated program based on sensor input (e.g., an accelerometer signal indicating a change in activity) or user input (e.g., using user interface 500). In some examples, to receive the updated program, external programmer 150 may receive the updated from a remote device. The stimulation parameters may comprise one or more of an electrode combination, a stimulation amplitude, a stimulation pulse width, a stimulation frequency, or a duty cycle.

External programmer 150 may generate, based on one or more differences between an existing program and the updated program, difference information indicating values for a subset of a plurality of stimulation parameters (804). In some examples, the existing program may be stored at IMD 110. Again, a medical device may be an implantable medical device (e.g., IMD 110) or an external medical device. In some examples, IMD 110 may apply the stimulation to the patient with the existing program before being configured to apply stimulation to the patient with the plurality of stimulation parameters. External programmer 150 may output the difference information to configure IMD 110 to apply stimulation to the patient with the plurality of stimulation parameters (806). For example, external programmer 150 may output the difference information to IMD 110.

In the above example, external programmer 150 may output the difference information. However, in some examples, a remote device (e.g., remote server 450 or remote client 452) may output the difference information to IMD 110 (e.g., via external programmer 150). For example, the remote device may perform one or more of 802-806.

IMD 110 may receive difference information indicating a subset of a plurality of stimulation parameters to apply the stimulation to the patient (808). For example, IMD 110 may receive the difference information from external programmer 150, from remote device (e.g., remote server 450 or client device 452), or from another device. IMD 110 may determine an updated program indicating the plurality of stimulation parameters based on an existing program and the difference information (810). For example, IMD 110 may modify existing stimulation parameters of the existing program using the difference information to determine the plurality of stimulation parameters of the updated program. IMD 110 may apply the updated program to configure IMD 110 to apply stimulation to the patient with the plurality of stimulation parameters (812).

In the above example, IMD 110 may receive the difference information. However, in some examples, external programmer 150 may receive the difference information and output a plurality of simulation parameters to IMD 110. For example, external programmer 150 may perform one or more of 908-912. In this example, external programmer 150 may output the updated program to IMD 110 to configure IMD 110 to apply stimulation to the patient with the plurality of stimulation parameters.

Figure 9:
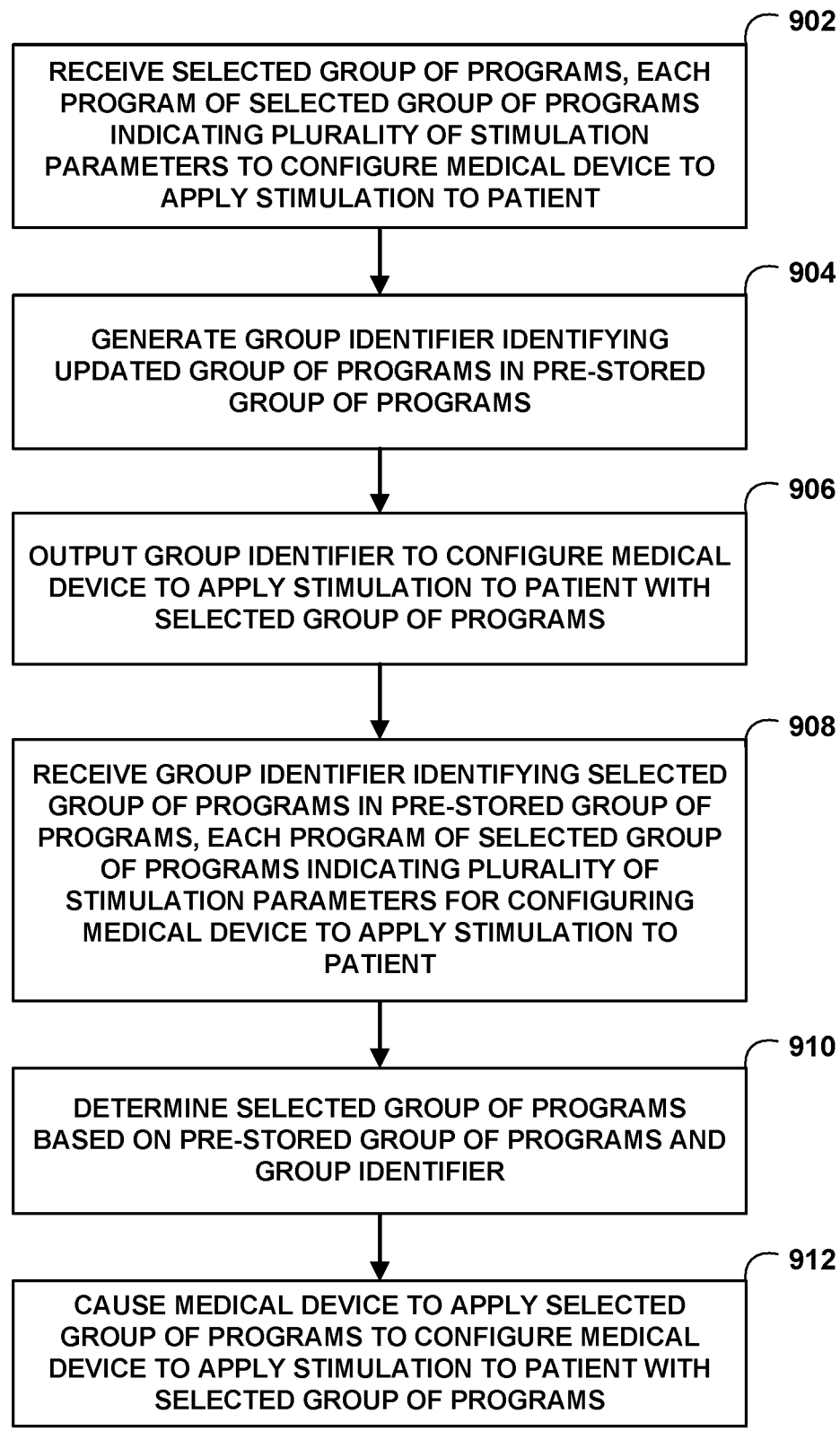
FIG. 9 is a flow diagram illustrating a process for using a selection of a group from a pre-stored group of a group of programs, in accordance with one or more techniques of this disclosure.

FIG. 9 is a flow diagram illustrating a process for using a selection of a group from a pre-stored group of a group of programs, in accordance with one or more techniques of this disclosure. FIG. 9 is discussed with reference to FIGS. 1-8 for example purposes only. In the following example, a remote device and an external programmer performs 902-906 of FIG. 9 and external programmer 150 performs 908-912. However, in other examples, other devices may perform the process of FIG. 9 as explained in further detail below. In the following examples, IMD 110 is used as a medical device. However, in some examples, an external medical device may be used instead of IMD 110.

A remote device (e.g., remote server 450 or client device 452) may receive a selected group of programs, each program of the selected group of programs indicating a plurality of stimulation parameters for configuring IMD 110 to apply the stimulation to the patient (902). For example, to receive the selected group of programs, the remote device may determine the updated program automatically or semi-automatically based on sensor input or user input (e.g., using user interface 500). In some examples, to receive the selected group of programs, the remote device may receive the selected group of programs from another device. In some examples, to receive the selected group of programs, the remote device may determine the selected group of programs, for example, using one or more automatic or semi-automatic processes. The stimulation parameters may comprise one or more of an electrode combination, a stimulation amplitude, a stimulation pulse width, a stimulation frequency, or a duty cycle.

The remote device may generate a group identifier identifying the selected group of programs in pre-stored groups of programs (e.g., pre-stored groups of programs) (904). The remote device may output the group identifier to configure IMD 110 to apply the stimulation to the patient with the selected group of programs (906). For example, the remote device may output the group identifier to external programmer 150.

External programmer 150 may receive a group identifier identifying an selected group of programs in pre-stored groups of programs, each program of the pre-stored groups of programs indicating a plurality of stimulation parameters for configuring IMD 110 to apply the stimulation to the patient (908). For example, external programmer 150 may receive the group identifier from a remote device (e.g., remote server 450 or client device 452). External programmer 150 may determine the selected group of programs based on the pre-stored groups of programs and the group identifier (910). For example, external programmer 150 may apply a look-up-table function to pre-stored groups of programs using the group identifier to determine the selected group of programs. External programmer 150 may cause IMD 110 to apply the updated program to configure IMD 110 to apply stimulation to the patient with the selected group of programs (912). For example, external programmer 150 may output, to IMD 110 and for each program of the selected group of programs, a plurality of stimulation parameters and IMD 110 applies stimulation to the patient with the plurality of stimulation parameters for each program of the selected group of programs.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The following clauses are a non-limiting list of examples in accordance with one or more techniques of this disclosure.

Clause 1A: A method for providing stimulation to a patient, the method comprising: receiving, by processing circuitry, an updated program indicating a plurality of stimulation parameters to configure a medical device to apply the stimulation to the patient; generating, by the processing circuitry, difference information based on one or more differences between an existing program and the updated program; and outputting, by the processing circuitry, the difference information to configure the medical device to apply stimulation to the patient with the plurality of stimulation parameters.

Clause 2A. The method of clause 1A, wherein receiving the updated program comprises receiving a user input indicating the updated program.

Clause 3A. The method of clause 1A, wherein receiving the updated program comprises receiving the updated program from a remote device.

Clause 4A. The method of any combination of clauses 1A-3A, wherein receiving the updated program comprises automatically generating the updated program based on a sensed condition, a user input, or the sensed condition and the user input.

Clause 5A. The method of any combination of clauses 1A-4A, wherein the stimulation parameters comprises one or more of an electrode combination, a stimulation amplitude, a stimulation pulse width, a stimulation frequency, or a duty cycle.

Clause 6A. The method of any combination of clauses 1A-5A, wherein the existing program is stored at the medical device.

Clause 7A. The method of any combination of clauses 1A-6A, wherein the medical device applies the stimulation to the patient with the existing program before being configured to apply stimulation to the patient with the plurality of stimulation parameters.

Clause 8A. The method of any combination of clauses 1A-7A, wherein the processing circuitry is arranged in an external programmer and wherein outputting comprises outputting the difference information from the external programmer to the medical device.

Clause 9A. The method of any combination of clauses 1A-7A, wherein the processing circuitry is arranged in a remote device and wherein outputting comprises outputting the difference information from the remote device to an external programmer.

Clause 10A. The method of any combination of clauses 1A-9A, wherein the medical device comprises an implantable medical device.

Clause 11A. A method for providing stimulation to a patient, the method comprising: receiving, by processing circuitry of an external programmer, difference information indicating a subset of a plurality of stimulation parameters to apply the stimulation to the patient; determining, by the processing circuitry, an updated program indicating the plurality of stimulation parameters based on an existing program and the difference information; and causing, by the processing circuitry, the medical device to apply the updated program to configure the medical device to apply stimulation to the patient with the plurality of stimulation parameters.

Clause 12A. The method of clause 11A, wherein the processing circuitry is arranged in an external programmer and wherein causing the medical device to apply the updated program comprises outputting the updated program to the medical device to configure the medical device to apply stimulation to the patient with the plurality of stimulation parameters.

Clause 13A. The method of clause 12A, further comprising receiving the difference information from a remote device.

Clause 14A. The method of clause 11A, wherein the processing circuitry is arranged in the medical device and wherein causing the medical device to apply the updated program comprises applying the updated program to configure the medical device to apply stimulation to the patient with the plurality of stimulation parameters.

Clause 15A. The method of clause 14A, further comprising receiving the difference information from an external programmer.

Clause 16A. The method of any combination of clauses 11A-15A, wherein the stimulation parameters comprises one or more of an electrode combination, a stimulation amplitude, a stimulation pulse width, a stimulation frequency, or a duty cycle.

Clause 17A. The method of any combination of clauses 11A-16A, wherein the existing program is stored at the medical device.

Clause 18A. The method of any combination of clauses 11A-17A, wherein the medical device applies the stimulation to the patient with the existing program before being configured to apply stimulation to the patient with the plurality of stimulation parameters.

Clause 19A. The method of any combination of clauses 11A-18A, wherein the medical device comprises an implantable medical device.

Clause 20A. A method for providing stimulation to a patient, the method comprising: receiving, by processing circuitry, a selected group of programs, each program of the selected group of programs indicating a plurality of stimulation parameters for configuring a medical device to apply the stimulation to the patient; generating, by the processing circuitry, a group identifier identifying the selected group of programs in pre-stored groups of programs; and outputting, by the processing circuitry, the group identifier to configure the medical device to apply the stimulation to the patient with the selected group of programs.

Clause 21A. The method of clause 20A, wherein receiving the selected group of programs comprises receiving a user input indicating the selected group of programs.

Clause 22A. The method of clause 20A, wherein receiving the selected group of programs comprises automatically generating the selected group of programs based on a sensed condition, a user input, or the sensed condition and the user input.

Clause 23A. The method of any combination of clauses 20A-22A, wherein the stimulation parameters comprises one or more of an electrode combination, a stimulation amplitude, a stimulation pulse width, a stimulation frequency, or a duty cycle.

Clause 24A. The method of any combination of clauses 20A-23A, wherein the processing circuitry is arranged in a remote device and wherein outputting comprises outputting the group identifier to an external programmer configured to apply stimulation to the patient with the plurality of stimulation parameters.

Clause 25A. The method of any combination of clauses 20A-24A, wherein the medical device comprises an implantable medical device.

Clause 26A. A method for providing stimulation to a patient, the method comprising: receiving, by processing circuitry, a group identifier identifying a selected group of programs in pre-stored groups of programs, each program of the selected group of programs indicating a plurality of stimulation parameters for configuring a medical device to apply the stimulation to the patient; determining, by the processing circuitry, the selected group of programs based on the pre-stored groups of programs and the group identifier; and outputting, by the processing circuitry, an indication of the selected group of programs to the medical device to configure the medical device to apply the stimulation to the patient with the selected group of programs.

Clause 27A. The method of clause 26A, further comprising: generating, by the processing circuitry, difference information based on one or more differences between the selected group of programs and a group of programs stored at the medical device; and wherein outputting the indication of the selected group of programs to the medical device comprises outputting the difference information.

Clause 28A. The method of clause 26A, wherein the processing circuitry is arranged in an external programmer.

Clause 29A. The method of any combination of clauses 26A-28A, further comprising receiving the group identifier from a remote device.

Clause 30A. The method of any combination of clauses 26A-29A, wherein the stimulation parameters comprises one or more of an electrode combination, a stimulation amplitude, a stimulation pulse width, a stimulation frequency, or a duty cycle.

Clause 31A. The method of any combination of clauses 26A-30A, wherein the medical device comprises an implantable medical device.

Clause 32A. A device for providing stimulation to a patient comprising one or more means for performing the method of any of clauses 1A-31A.

Clause 33A. The device of clause 32A, wherein the device comprises an implanted medical device, an external programmer, or a remote device.

Clause 34A. A system for providing stimulation to a patient comprising processing circuitry configured to perform the method of any of clauses 1A-31A.

Clause 35A. A computer-readable storage medium having stored thereon instructions that, when executed, cause processing circuitry to perform the method of any of clauses 1A-31A.

Clause 1B. A system for providing stimulation to a patient, the system comprising one or more processors configured to: receive an updated program indicating a plurality of stimulation parameters to configure a medical device to apply the stimulation to the patient; generate difference information based on one or more differences between an existing program and the updated program; and output the difference information to configure the medical device to apply stimulation to the patient with the plurality of stimulation parameters.

Clause 2B. The system of clause 1B, wherein, to receive the updated program, the one or more processors are configured to receive a user input indicating the updated program.

Clause 3B. The system of clause 1B, wherein, to receive the updated program, the one or more processors are configured to receive the updated program from a remote device.

Clause 4B. The system of clauses 1B-3B, wherein, to receive the updated program, the one or more processors are configured to automatically generate the updated program based on a sensed condition, a user input, or the sensed condition and the user input.

Clause 5B. The system of clauses 1B-4B, wherein the stimulation parameters comprises one or more of an electrode combination, a stimulation amplitude, a stimulation pulse width, a stimulation frequency, or a duty cycle.

Clause 6B. The system of clauses 1B-5B, wherein the existing program is stored at the medical device.

Clause 7B. The system of clauses 1B-6B, wherein the medical device is configured to apply the stimulation to the patient with the existing program before being configured to apply stimulation to the patient with the plurality of stimulation parameters.

Clause 8B. The system of clauses 1B-7B, wherein the one or more processors are arranged in an external programmer and wherein, to output the difference information, the one or more processors are configured to output the difference information from the external programmer to the medical device.

Clause 9B. The system of clauses 1B-7B, wherein the one or more processors are arranged in a remote device and wherein, to output the difference information, the one or more processors are configured to output the difference information from the remote device to an external programmer.

Clause 10B. The system of clauses 1B-9B, wherein the medical device comprises an implantable medical device.

Clause 11B. A system for providing stimulation to a patient, the system comprising one or more processors configured to: receive difference information indicating a subset of a plurality of stimulation parameters to apply the stimulation to the patient; determine an updated program indicating the plurality of stimulation parameters based on an existing program and the difference information; and cause the medical device to apply the updated program to configure the medical device to apply stimulation to the patient with the plurality of stimulation parameters.

Clause 12B. The system of clause 11B, wherein the one or more processors are arranged in an external programmer and wherein, to cause the medical device to apply the updated program, the one or more processors are configured to output the updated program to the medical device to configure the medical device to apply stimulation to the patient with the plurality of stimulation parameters.

Clause 13B. The system of clause 12B, wherein the one or more processors are further configured to receive the difference information from a remote device.

Clause 14B. The system of clause 11B, wherein the one or more processors are arranged in the medical device and wherein, to cause the medical device to apply the updated program, the one or more processors are configured to apply the updated program to configure the medical device to apply stimulation to the patient with the plurality of stimulation parameters.

Clause 15B. The system of clause 14B, wherein the one or more processors are further configured to receive the difference information from an external programmer.

Clause 16B. The system of clauses 11B-15B, wherein the stimulation parameters comprises one or more of an electrode combination, a stimulation amplitude, a stimulation pulse width, a stimulation frequency, or a duty cycle.

Clause 17B. The system of clauses 11B-16B, wherein the existing program is stored at the medical device.

Clause 18B. The system of clauses 11B-17B, wherein the medical device is configured to apply the stimulation to the patient with the existing program before being configured to apply stimulation to the patient with the plurality of stimulation parameters.

Clause 19B. The system of clauses 11B-18B, wherein the medical device comprises an implantable medical device.

Clause 20B. A system for providing stimulation to a patient, the system comprising one or more processors configured to: receive a selected group of programs, each program of the selected group of programs indicating a plurality of stimulation parameters for configuring a medical device to apply the stimulation to the patient; generate a group identifier identifying the selected group of programs in pre-stored groups of programs; and output the group identifier to configure the medical device to apply the stimulation to the patient with the selected group of programs.

Clause 21B. The system of clause 20B, wherein, to receive the selected group of programs, the one or more processors are configured to receive a user input indicating the selected group of programs.

Clause 22B. The system of clause 20B, wherein, to receive the selected group of programs, the one or more processors are configured to automatically generate the selected group of programs based on a sensed condition, a user input, or the sensed condition and the user input.

Clause 23B. The system of clauses 20B-22B, wherein the stimulation parameters comprises one or more of an electrode combination, a stimulation amplitude, a stimulation pulse width, a stimulation frequency, or a duty cycle.

Clause 24B. The system of clauses 20B-23B, wherein the one or more processors are arranged in a remote device and wherein, to output the group identifier, the one or more processors are configured to output the group identifier to an external programmer configured to apply stimulation to the patient with the plurality of stimulation parameters.

Clause 25B. The system of clauses 20B-24B, wherein the medical device comprises an implantable medical device.

Clause 26B. A system for providing stimulation to a patient, the system comprising one or more processors configured to: receive a group identifier identifying a selected group of programs in pre-stored groups of programs, each program of the selected group of programs indicating a plurality of stimulation parameters for configuring a medical device to apply the stimulation to the patient; determine the selected group of programs based on the pre-stored groups of programs and the group identifier; and output an indication of the selected group of programs to the medical device to configure the medical device to apply the stimulation to the patient with the selected group of programs.

Clause 27B. The system of clause 26B, wherein the one or more processors are further configured to: generate difference information based on one or more differences between the selected group of programs and a group of programs stored at the medical device; and wherein, to output the indication of the selected group of programs to the medical device, the one or more processors are configured to output the difference information.

Clause 28B. The system of clause 26B, wherein the one or more processors are arranged in an external programmer.

Clause 29B. The system of clauses 26B-28B, wherein the one or more processors are further configured to receive the group identifier from a remote device.

Clause 30B. The system of clauses 26B-29B, wherein the stimulation parameters comprises one or more of an electrode combination, a stimulation amplitude, a stimulation pulse width, a stimulation frequency, or a duty cycle.

Clause 31B. The system of clauses 26B-30B, wherein the medical device comprises an implantable medical device.

Clause 32B. A computer-readable storage medium having stored thereon instructions that, when executed, cause processing circuitry to: receive an updated program indicating a plurality of stimulation parameters to configure a medical device to apply the stimulation to a patient; generate difference information based on one or more differences between an existing program and the updated program; and output the difference information to configure the medical device to apply stimulation to the patient with the plurality of stimulation parameters.

Clause 33B. A computer-readable storage medium having stored thereon instructions that, when executed, cause processing circuitry to: receive difference information indicating a subset of a plurality of stimulation parameters to apply the stimulation to the patient; determine an updated program indicating the plurality of stimulation parameters based on an existing program and the difference information; and cause the medical device to apply the updated program to configure the medical device to apply stimulation to the patient with the plurality of stimulation parameters.

Clause 34B. A computer-readable storage medium having stored thereon instructions that, when executed, cause processing circuitry to: receive a selected group of programs, each program of the selected group of programs indicating a plurality of stimulation parameters for configuring a medical device to apply the stimulation to the patient; generate a group identifier identifying the selected group of programs in pre-stored groups of programs; and output the group identifier to configure the medical device to apply the stimulation to the patient with the selected group of programs.

Clause 35B. A computer-readable storage medium having stored thereon instructions that, when executed, cause processing circuitry to: receive a group identifier identifying a selected group of programs in pre-stored groups of programs, each program of the selected group of programs indicating a plurality of stimulation parameters for configuring a medical device to apply the stimulation to the patient; determine the selected group of programs based on the pre-stored groups of programs and the group identifier; and output an indication of the selected group of programs to the medical device to configure the medical device to apply the stimulation to the patient with the selected group of programs.

Clause 1C. A system for providing stimulation to a patient, the system comprising one or more processors configured to: receive an updated program indicating a plurality of stimulation parameters to configure a medical device to apply the stimulation to the patient; generate difference information based on one or more differences between an existing program and the updated program; and output the difference information to configure the medical device to apply stimulation to the patient with the plurality of stimulation parameters.

Clause 2C. The system of clause 1C, wherein, to receive the updated program, the one or more processors are configured to receive a user input indicating the updated program.

Clause 3C. The system of clause 1C, wherein, to receive the updated program, the one or more processors are configured to receive the updated program from a remote device.

Clause 4C. The system of clause 1C, wherein, to receive the updated program, the one or more processors are configured to: receive a group identifier identifying a selected group of programs in pre-stored groups of programs, each program of the selected group of programs indicating the plurality of stimulation parameters for configuring the medical device to apply the stimulation to the patient; and determine the updated program based on the pre-stored groups of programs and the group identifier.

Clause 5C. The system of clause 4C, wherein the one or more processors are further configured to receive the group identifier from a remote device.

Clause 6C. The system of clause 1C, wherein, to receive the updated program, the one or more processors are configured to automatically generate the updated program based on a sensed condition, a user input, or the sensed condition and the user input.

Clause 7C. The system of clauses 1C-6C, wherein the stimulation parameters comprises one or more of an electrode combination, a stimulation amplitude, a stimulation pulse width, a stimulation frequency, or a duty cycle.

Clause 8C. The system of clauses 1C-7C, wherein the existing program is stored at the medical device.

Clause 9C. The system of clauses 1C-8C, wherein the medical device is configured to apply the stimulation to the patient with the existing program before being configured to apply stimulation to the patient with the plurality of stimulation parameters.

Clause 10C. The system of clauses 1C-9C, wherein the one or more processors are arranged in an external programmer and wherein, to output the difference information, the one or more processors are configured to output the difference information from the external programmer to the medical device.

Clause 11C. The system of clauses 1C-10C, wherein the medical device comprises an implantable medical device.

Clause 12C. A computer-readable storage medium comprising instructions that when executed cause one or more processors to: receive an updated program indicating a plurality of stimulation parameters to configure a medical device to apply the stimulation to the patient; generate difference information based on one or more differences between an existing program and the updated program; and output the difference information to configure the medical device to apply stimulation to the patient with the plurality of stimulation parameters.

Clause 13C. The computer-readable storage medium of clause 12C, further comprising instructions that cause the one or more processors to perform the operations of the one or more processors of any of clauses 2C-6C.

Clause 14C. A method for providing stimulation to a patient, the method comprising: receiving, by processing circuitry, an updated program indicating a plurality of stimulation parameters to configure a medical device to apply the stimulation to the patient; generating, by the processing circuitry, difference information based on one or more differences between an existing program and the updated program; and outputting, by the processing circuitry, the difference information to configure the medical device to apply stimulation to the patient with the plurality of stimulation parameters.

Clause 15C. The method of clause 14C, wherein receiving the updated program comprises: receiving a group identifier identifying a selected group of programs in pre-stored groups of programs, each program of the selected group of programs indicating the plurality of stimulation parameters for configuring the medical device to apply the stimulation to the patient; and determining the updated program based on the pre-stored groups of programs and the group identifier.

Clause 16C. The method of clause 14C, further comprising receiving the group identifier from a remote device.

Clause 17C. The method of clause 14C, wherein receiving the updated program comprises automatically generating the updated program based on a sensed condition, a user input, or the sensed condition and the user input.

Clause 18C. The method of clauses 14C-17C, wherein the stimulation parameters comprises one or more of an electrode combination, a stimulation amplitude, a stimulation pulse width, a stimulation frequency, or a duty cycle.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A system for providing neurostimulation to a patient, the system comprising one or more processors configured to:
   receive an updated program indicating a second set of stimulation parameters to configure a medical device, that is applying neurostimulation according to an existing program with a first set of stimulation parameters, to apply neurostimulation according to the second set of stimulation parameters to the patient;
   generate difference information based on one or more differences between the existing program and the updated program; and
   output the difference information to configure the medical device to switch from applying the neurostimulation according to the first set of stimulation parameters of the existing program to applying the neurostimulation according to the second set of stimulation parameters of the updated program to the patient within less than 30 seconds.

2. The system of claim 1, wherein, to receive the updated program, the one or more processors are configured to receive a user input indicating the updated program.

3. The system of claim 1, wherein, to receive the updated program, the one or more processors are configured to receive the updated program from a remote device.

4. The system of claim 1, wherein, to receive the updated program, the one or more processors are configured to:
   receive a group identifier identifying a selected group of programs of a plurality of pre-stored groups of programs, each program of the selected group of programs indicating a respective set of stimulation parameters for configuring the medical device to apply neurostimulation according to the respective set of stimulation parameters; and determine the updated program based on the selected group of programs and the group identifier.

5. The system of claim 4, wherein the one or more processors are further configured to receive the group identifier from a remote device.

6. The system of claim 1, wherein, to receive the updated program, the one or more processors are configured to automatically generate the updated program based on a sensed condition, a user input, or the sensed condition and the user input.

7. The system of claim 1, wherein the stimulation parameters comprises one or more of an electrode combination, a stimulation amplitude, a stimulation pulse width, a stimulation frequency, or a duty cycle.

8. The system of claim 1, wherein the existing program is stored at the medical device.

9. The system of claim 1, wherein the medical device is configured to apply the neurostimulation according to the first set of stimulation parameters of the existing program before being configured to apply the neurostimulation according to the second set of parameters of the updated program.

10. The system of claim 1, wherein the one or more processors are arranged in an external programmer and wherein, to output the difference information, the one or more processors are configured to output the difference information from the external programmer to the medical device.

11. The system of claim 1, wherein the medical device comprises an implantable medical device.

12. A non-transitory computer-readable storage medium comprising instructions that when executed cause one or more processors to:

receive an updated program indicating a second set of stimulation parameters to configure a medical device, that is applying neurostimulation according to an existing program with a first set of stimulation parameters, to apply neurostimulation according to the second set of stimulation parameters to a patient;

generate difference information based on one or more differences between the existing program and the updated program; and output the difference information to configure the medical device to switch from applying the neurostimulation according to the first set of stimulation parameters of the existing program to applying the neurostimulation according to the second set of stimulation parameters of the update program to the patient within less than 30 seconds.

13. A method for providing neurostimulation to a patient, the method comprising:

receiving, by processing circuitry, an updated program indicating a second set of stimulation parameters to configure a medical device, that is applying neurostimulation according to an existing program with a first set of stimulation parameters to apply neurostimulation according to the second set of stimulation parameters of the updated program to the patient;

generating, by the processing circuitry, difference information based on one or more differences between the existing program and the updated program; and outputting, by the processing circuitry, the difference information to configure the medical device to switch from applying the neurostimulation according to the first set of stimulation parameters of the existing program to applying the neurostimulation according to the second set of stimulation parameters of the updated program to the patient in less than 30 seconds.

14. The method of claim 13, wherein receiving the updated program comprises:

receiving a group identifier identifying a selected group of programs of a plurality of pre-stored groups of programs, each program of the selected group of programs indicating a respective set of stimulation parameters for configuring the medical device to apply neurostimulation according to the respective set of stimulation parameters; and determining the updated program based on the selected group of programs and the group identifier.

15. The method of claim 14, further comprising receiving the group identifier from a remote device.

16. The method of claim 13, wherein receiving the updated program comprises receiving a user input indicating the updated program.

17. The method of claim 13, wherein receiving the updated program comprises receiving the updated program from a remote device.

18. The method of claim 13, wherein receiving the updated program comprises automatically generating the updated program based on a sensed condition, a user input, or the sensed condition and the user input.

19. The method of claim 13, wherein the stimulation parameters comprises one or more of an electrode combination, a stimulation amplitude, a stimulation pulse width, a stimulation frequency, or a duty cycle.

20. The method of claim 13, wherein the existing program is stored at the medical device.

* * * * *